(12) United States Patent  
Teeter

(10) Patent No.: US 9,361,776 B2  
(45) Date of Patent: *Jun. 7, 2016

(54) DISPOSABLE AND TAMPER-RESISTANT RFID LOCK

(71) Applicant: Charles Michael Teeter, Joplin, MO (US)

(72) Inventor: Charles Michael Teeter, Joplin, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 14/730,090

(22) Filed: Jun. 3, 2015

(65) Prior Publication Data

US 2015/0269819 A1  Sep. 24, 2015

Related U.S. Application Data

(63) Continuation of application No. 14/185,671, filed on Feb. 20, 2014, now Pat. No. 9,076,312, which is a continuation-in-part of application No. 13/625,230, filed on Sep. 24, 2012, now Pat. No. 8,710,991, and a continuation-in-part of application No. 12/819,902, filed on Jun. 21, 2010, now Pat. No. 8,274,389, and a continuation of application No. 11/960,128, filed on Dec. 19, 2007, now Pat. No. 7,800,504.

(60) Provisional application No. 60/875,726, filed on Dec. 19, 2006.

(51) Int. Cl.
   *G08B 13/14*   (2006.01)
   *G08B 13/24*   (2006.01)
   *G06K 19/077*  (2006.01)
   *G09F 3/03*    (2006.01)
   *G06K 1/00*    (2006.01)
   *E05B 1/00*    (2006.01)

(52) U.S. Cl.
   CPC ...... *G08B 13/2431* (2013.01); *G06K 19/07798* (2013.01); *G08B 13/2434* (2013.01); *G09F 3/0317* (2013.01); *G09F 3/0335* (2013.01); *E05B 1/00* (2013.01); *G06K 1/00* (2013.01); *Y10T 29/49826* (2015.01)

(58) Field of Classification Search
   CPC ....... E05B 1/00; G06K 19/07749; G06K 1/00
   See application file for complete search history.

(56) References Cited

U.S. PATENT DOCUMENTS 6,188,320 B1 * 2/2001 Kolton et al. ............. 340/572.9  
6,265,973 B1  7/2001 Brammall et al.

(Continued)

OTHER PUBLICATIONS

Office Action with Restriction Requirement, U.S. Appl. No. 13/625,230, mailed Jun. 20, 2013, 6 pages.

(Continued)

*Primary Examiner* — Shirley Lu  
(74) *Attorney, Agent, or Firm* — Polsinelli PC

(57) ABSTRACT

Implementations described and claimed herein provide an RFID locking apparatus including an RFID tag, a locking member, and a disabling member. The RFID tag is disposed inside a housing and has a chip and an antenna that emits a signal. The locking member includes a tube that extends outwardly from within the housing and a cable connected to the disabling member and exiting the housing via the tube. The locking member configured to compress a spring into a loaded state by pulling the cable. The disabling member is disposed near the spring inside the housing and is configured to destroy the antenna and/or the chip, such that the signal cannot be emitted, upon release of the spring from the loaded state. The RFID locking apparatus is configured to release the spring when the locking member is damaged.

7 Claims, 17 Drawing Sheets

(56) References Cited

U.S. PATENT DOCUMENTS

| | | | |
|---|---|---|---|
| 7,486,188 B2* | 2/2009 | Van Alstyne | 340/572.1 |
| 2004/0113782 A1* | 6/2004 | Auerbach et al. | 340/568.1 |
| 2007/0024066 A1 | 2/2007 | Terry et al. | |
| 2009/0026773 A1* | 1/2009 | Terry et al. | 292/327 |
| 2010/0283578 A1 | 11/2010 | Henderson | |
| 2012/0235815 A1 | 9/2012 | Coveley et al. | |
| 2013/0021157 A1 | 1/2013 | Teeter | |

OTHER PUBLICATIONS

Response to Office Action with Restriction Requirement, U.S. Appl. No. 13/625,230, filed Aug. 20, 2013, 7 pages.

Notice of Allowance, U.S. Appl. No. 13/625,230, mailed Oct. 21, 2013, 33 pages.

International Search Report and Written Opinion, PCT Application No. PCT/US2015/016812, mailed May 29, 2015, 14 pages.

* cited by examiner

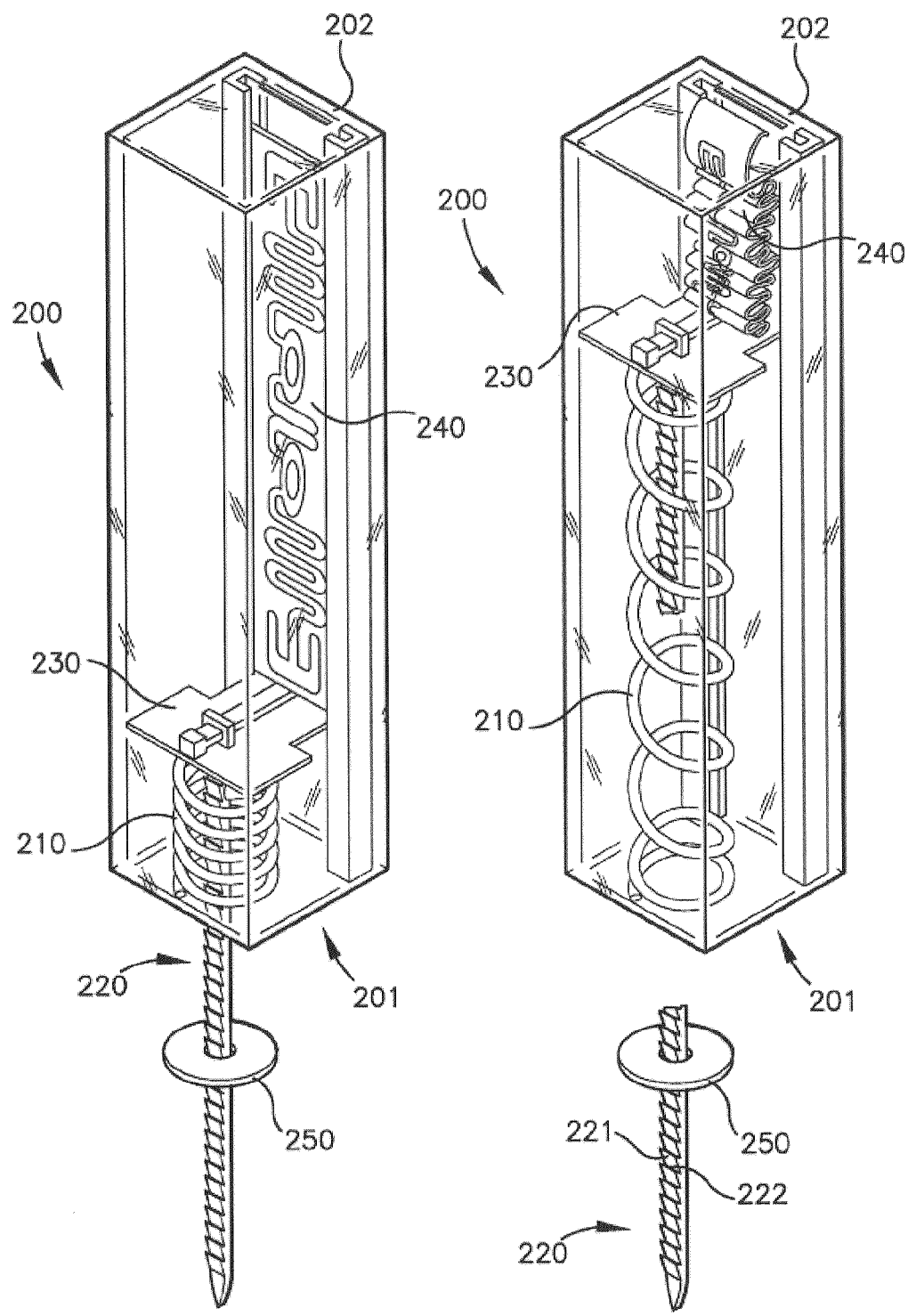

DISPOSABLE AND TAMPER-RESISTANT RFID LOCK

CROSS-REFERENCE TO RELATED APPLICATIONS

The present application claims benefit of priority under 35 U.S.C. §120 to and is a continuation of U.S. application Ser. No. 14/185,671, filed on Feb. 20, 2014, which is a continuation-in-part of U.S. application Ser. No. 13/625,230, filed on Sep. 24, 2012, now U.S. Pat. No. 8,710,991, which is a continuation-in-part of U.S. application Ser. No. 12/819,902 filed on Jun. 21, 2010, now U.S. Pat. No. 8,274,389, which is a continuation of U.S. application Ser. No. 11/960,128 filed Dec. 19, 2007, now U.S. Pat. No. 7,800,504 which claims benefit of priority under 35 U.S.C. §119(e) to U.S. Application Ser. No. 60/875,726 filed on Dec. 19, 2006. All of the aforementioned patent applications are hereby incorporated by reference in their entirety.

BACKGROUND

Various industries, including, but not limited to, airline and food and drug industries, are increasingly utilizing radio frequency identification ("RFID") technology to identify, track, and locate goods or assets being shipped or transported. However, during shipment or transportation, the goods or assets are vulnerable to harmful activities that threaten their security and integrity. For example, the goods or assets may be vulnerable to tampering, theft, terrorism, or similar activities. To protect against such harmful activities, many industries utilize conventional locks to secure access to the goods or assets. However, without visually examining each of such locks, which is generally time consuming, expensive, and inefficient, it is a challenge to detect whether harmful activities were attempted or have occurred. Furthermore, such visual examination may not indicate whether harmful activities were concealed by merely replacing the lock with another lock that is similar in appearance.

It is with these and other issues in mind that various aspects of the present disclosure were developed.

SUMMARY

Implementations described and claimed herein address the foregoing problems by providing a cost-prohibitive, disposable RFID locking apparatus that secures goods or assets and conveys information regarding the identification and location of the goods or assets and whether the goods or assets have been potentially subjected to harmful activities. In one implementation, the RFID locking apparatus includes an RFID tag, a locking member, and a disabling member. The RFID tag is disposed inside a housing and has a chip and an antenna that emits a signal. The locking member includes a tube that extends outwardly from within the housing. A cable connects to the disabling member and through the tube. The cable is configured to compress a spring into a loaded state. The disabling member is disposed near the spring inside the housing and is configured to damage the antenna and/or the chip, such that the signal cannot be emitted, upon release of the spring from the loaded state. The RFID locking apparatus is configured to release the spring when the locking member is damaged.

Other implementations are also described and recited herein.

BRIEF DESCRIPTION OF THE DRAWINGS

Example implementations are illustrated in referenced figures of the drawings. It is intended that the implementations and figures disclosed herein are to be considered illustrative rather than limiting.

FIG. 2 is a perspective view of another example RFID locking apparatus.

FIG. 2A illustrates the RFID locking apparatus of FIG. 2 with a disabled RFID tag.

DETAILED DESCRIPTION

Aspects of the presently disclosed technology involve a cost-prohibitive, disposable RFID locking apparatus that secures one or more goods or assets and conveys information regarding the identification and location of the goods or assets and whether the goods or assets have been potentially subjected to harmful activities. Generally, the RFID locking apparatus includes an RFID tag having a chip and an antenna that emits a signal that may be detected by one or more RFID readers, which may be handheld or stationary. The signal emitted includes an identifying number, which when read by the RFID reader, identifies particular goods or assets associated with that number. With this identification number, the location of the goods or assets may be tracked as they are shipped or transported each time the identification number is detected by RFID readers at various locations. The RFID tag is disposed inside a housing such that the RFID tag cannot be tampered with or otherwise damaged. The identification number may be displayed through a window in the housing to confirm that the RFID tag was not replaced with another RFID tag during shipment or transportation.

To secure the goods or assets, the RFID locking apparatus includes a locking member extending outwardly from within the housing, which may be connected to an apparatus (such as a door, hatch, lid, etc.) that prevents access to the goods or assets. The locking member is configured to compress a spring into a loaded state. When the locking member is connected to the apparatus with the spring in the loaded state, the goods or assets are secure. Each time the signal from the RFID tag is read by one of the RFID readers, the security and integrity of the goods and assets is confirmed.

To detect whether the goods or assets have been potentially subjected to harmful activities, the RFID locking apparatus includes a disabling member disposed near the spring, inside the housing. The disabling member is configured to damage the antenna and/or the chip of the RFID tag such that the signal cannot be emitted. The disabling member may be, for example, a plate, a flange, a blade, or a puncturing member, and the antenna may be damaged, for example, by crushing, crumpling, cutting, or puncturing the RFID tag. The disabling member is configured to damage the antenna and/or the chip upon the release of the spring from the loaded state. The spring is released from the loaded state when the locking member is damaged. For example, the spring is released from the loaded state when the locking member is cut. Because the signal is not emitted after the spring is released from the loaded state, the RFID readers will not detect the identification number associated with the goods or assets, the lack of detection indicating that the goods or assets have been potentially subjected to harmful activities. Various example implementations of the RFID locking apparatus are described below.

Figure 1:
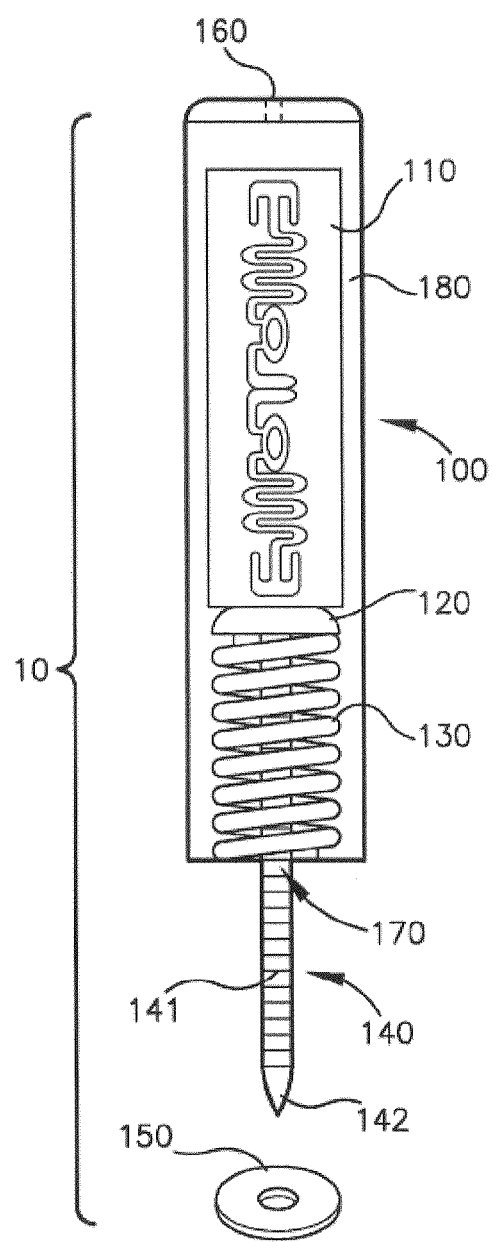
FIG. 1 illustrates a front view of an example RFID locking apparatus.

One example implementation of the RFID locking apparatus is shown in FIG. 1. An RFID locking apparatus 10 comprises a housing 100 that contains a flexible RFID tag 110, a plate 120, a spring 130, a portion of a locking stem 140 attached to the plate 120, and a locking washer 150. In the example implementation shown in FIG. 1, the disabling member comprises the plate 120 and the locking member comprises the locking stem 140 and the locking washer 150.

The housing 100 has openings at a top 160 and a bottom 170 of its structure. The top opening 160 allows a user to thread the RFID tag 110 into a cavity 180 of the housing 100. The top opening 160 is configured to allow the RFID tag 110 to be threaded into the cavity 180. In addition, the top opening 160 is sufficiently narrow to prevent other items with greater width than the RFID tag 110 from entering the cavity 180 and to substantially prevent the RFID tag 110 from inadvertently passing back through the top opening 160. The bottom opening 170 of the housing 100 is configured to allow the locking stem 140 to move freely in and out of the housing 110. The housing is made of any suitable material, such as plastic, metal or ceramic, that is resistant to moisture and electrical charge and that allows a signal from the RFID tag 110 to be detected.

Pulling the locking stem 140 in a direction away from the bottom opening 170 of the housing 100 causes the plate 120 attached to the locking stem 140 to compress or "load" the spring 130. In one implementation, the locking stem 140 further comprises a plurality of one way ratchets 141, which when passed through the locking washer 150, prevents the locking stem 140 from moving in a reverse direction through the locking washer 150. As a result of the one way ratchets 141, when a tail end 142 of the locking stem 140 passes through the locking washer 150, the only direction the locking stem 140 may move is away from the bottom opening 170 of the housing 100. Since the plate 120 is attached to the locking stem 140, it too may only move in one direction once the locking washer 150 has engaged the locking stem 140. Such direction would be down towards the bottom opening 170 of the housing 100.

By way of example, the presently disclosed technology may be used to secure or lock a hatch or opening of a trailer containing dry food. The hatch or opening of the trailer may have a first metal ring attached to the trailer and a second metal ring attached to the hatch. The first metal ring aligns with the second metal ring attached to the hatch. To secure the hatch or opening, the tail end 142 of the locking stem 140 is threaded through the second metal ring attached to the hatch. The width or diameter of the housing 100 is adapted to prevent the housing 100 from passing through the second metal ring or the first metal ring. The tail end 142 of the locking stem 140 is threaded through the first metal ring. To lock or secure the hatch to the trailer, the tail end 142 of the locking stem 140 is threaded and pulled through the locking washer 150. The tail end 142 is pulled until the plate 120 loads the spring 130 sufficiently near the bottom opening 170 of the housing 100. As described previously, the one way ratchets 141 of the locking stem 140 prevent the locking stem 140 or plate 120 from moving upwards or into the cavity 180 of the housing 100. The one way ratchets 141 also prevent others from unlocking the RFID locking apparatus 10 from the hatch or opening of the trailer unless they cut the locking stem 140 in the area between the bottom opening 170 of the housing 100 and the locking washer 150. Once the hatch of the trailer is locked by the RFID locking apparatus 10, the RFID tag 110 is inserted through the top opening of the housing 160.

Figure 1A:
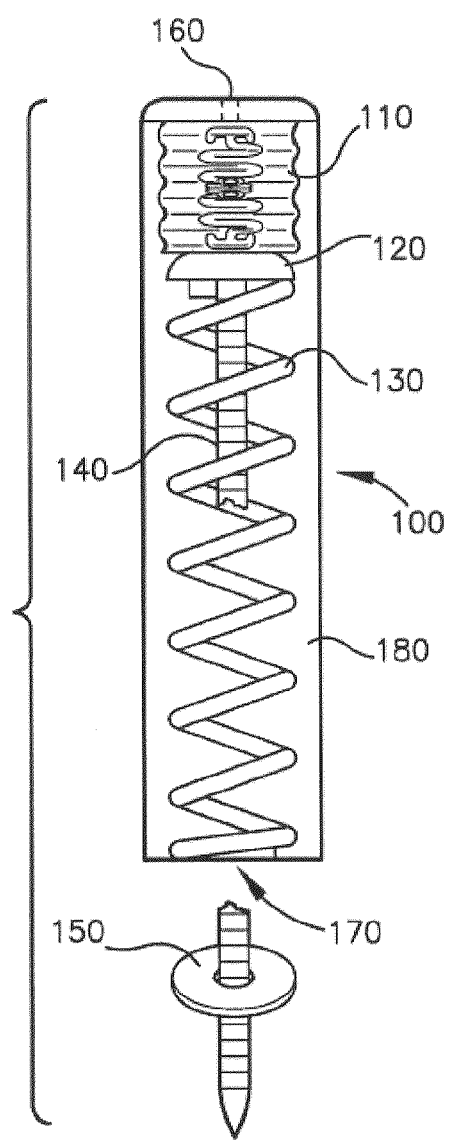
FIG. 1A shows the RFID locking apparatus of FIG. 1 with a disabled RFID tag.

FIG. 1A shows the RFID locking apparatus 10 of FIG. 1 with the RFID tag 110 disabled. As shown in FIG. 1A, in one implementation, the disabling member disables the RFID tag 110 when the locking stem 140 is severed. A user would know both visually and through the disablement of the RFID tag 110 that the hatch may have been opened and the goods or assets secured by the RFID locking apparatus 10 may have been subjected to potentially harmful activities. An RFID reader (not pictured) would be unable to detect a signal from the RFID tag 110 because the release of the locking stem 140 from the locking washer 150 results in the spring 130 unloading or decompressing and pushing the plate 120 towards the top opening 160 of the housing 100, thereby crushing or crumpling the RFID tag 110. In other words, the plate 120 is of sufficient diameter or width such that when it is pushed by the spring 130 towards the top opening 160 of the housing 100, it will crush or crumple the RFID tag 110. Even slightly bending an RFID tag 110, such as the RFID tag 110, (to a radius of approximately 25 mm or less) will result in the RFID tag 110 being unable to respond to a signal put out by an RFID reader. As such, once the disabling member, in this implementation the plate 120, crushes or crumples the RFID tag 110, an antenna and/or a chip of the RFID tag 110 is destroyed such that a signal is no longer emitted that can be received by the RFID reader.

Accordingly, the user would be alerted not only that the RFID tag 110 was not emitting a signal but, in addition, that harmful activities may have occurred by visually observing that the spring 130 was unloaded and that the plate 120 was in a position near the top of the housing 100.

The presently disclosed technology enables quick identification and location a particular asset or good secured by the RFID locking apparatus 10. Prior to transporting a good or asset contained in a transportable container, each unique identifying code associated with each RFID tag 110 contained in a housing 100 may be recorded. At every location with an RFID reader system in place, the unique identifying codes associated with the goods or assets are monitored. As such, not only is the identity of the particular good or asset know, but in addition, the location of the good or asset at the time the RFID tag 110 was read is known. As described previously, if the RFID tag 110 was disabled during the course of the transportation of the asset or good, the user would quickly be able to determine the identity of the good or asset that was subjected to potentially harmful activities.

As illustrated in FIG. 2, another example implementation of the RFID locking apparatus comprises: a housing 200 having a bottom opening 201; an RFID slot 202 configured to receive and hold a flexible RFID tag 240 in place in the housing 200; a spring 210; a portion of a locking stem 220; a flange 230; an RFID tag 240; and a locking washer 250. The housing 200 may be made of any suitable material, such a plastic, ceramic, or metal, that is resistant to moisture and electrical charge and that allows a signal emitted from the RFID tag 240 to be detected. In the example implementation shown in FIG. 2, the disabling member comprises the flange 230 and the locking member comprises the locking stem 220 and the locking washer 250.

FIG. 2 shows the spring 210 in a compressed or loaded state and the flange 230 in a horizontal position (relative to the vertical position of the RFID tag 240) located underneath the RFID tag 240. Positioning the flange 230 underneath the RFID tag 240 is accomplished by first pulling the locking stem 220 in a direction that is downward or away from the bottom opening 201 of the housing 200. In one implementation, the locking stem 220 is connected to the flange 230. Pulling the locking stem 220 downward forces the flange 230 to move downward towards the bottom opening 201 of the housing 200 and in addition loads or compresses the spring 210. Prior to pulling the locking stem 200 down, the flange 230 rests against the RFID tag 240 in a vertical position adjacent the top opening 202 of the housing 200. As the flange 230 is pulled downwards, the pulling force from the locking stem 220 incrementally turns the flange 230 from its vertical position to the horizontal position seen in FIG. 2. Once the flange 230 turns to its horizontal position, it locks into such horizontal position by way of a locking flange mechanism. While a simple and cost-effective implementation is shown in FIG. 2, it is contemplated that several mechanisms exist and may be utilized to hold an RFID tag in a housing and load a spring. The embodiment in FIG. 2 is shown by way of example and is not meant to limit the means of holding an RFID tag and loading a spring.

After the flange 230 is positioned underneath the RFID tag 240 and the spring 210 is in a loaded state, the locking washer 250 is used to secure the locking stem 220. The locking stem 220 is secured by the locking washer 250 through a one-way ratchet design of the locking stem 220. A plurality of ratchets 221, 222, as shown in FIG. 2A, are located on the locking stem 220. The ratchets 221, 222 prevent the locking stem 220 from moving back through the locking washer 250 because of the one way ratchet design. The locking stem 220 may be pulled through the locking washer 250 until the locking washer 250 rests against the bottom of the housing 200. In this way, the spring 210 remains in a loaded or compressed state unless and until the locking stem 220 is severed or the locking washer 250 removed from the locking stem 220.

Referring now to FIG. 2A, the RFID tag 240 is shown in a disabled state. The locking stem 220 has been severed between the locking washer 250 and the bottom opening 201. With nothing to prevent the spring 210 from returning to its uncompressed state, the locking stem 220 and flange 230 are pushed upwards from the force of the spring 210 uncoiling. Since the flange 230 is locked in its horizontal position underneath the RFID tag 240, the upward pushing force of the spring 210 crushes or crumples the RFID tag 240. Once the RFID tag 240 is crushed or crumpled, the RFID tag 240 becomes unreadable or virtually unreadable because of the disruption in the signal emitted from the RFID tag 240. Specifically, once the RFID tag 240 is crushed or crumpled, an antenna and/or a chip in the RFID tag 240 is destroyed, preventing a signal from being emitted from the RFID tag 240.

The implementation shown in FIG. 2 and FIG. 2A is provided by way of example only and is not meant to limit the means for crushing or disabling an RFID tag. For example, as described herein, it is contemplated that an RFID tag may be disabled by way of a cutting means. In such a device, tampering with the RFID locking apparatus would result in a sharp object cutting the RFID tag in a location such that it would be effectively unreadable by an RFID reader. Yet another example contemplated as a means for disabling the RFID tag is a pneumatic force that is activated in response to tampering with the RFID locking apparatus. In lieu of a spring, the activation of a pneumatic force would push a disabling member, such as a plate, flange, or tab, located underneath the RFID tag so that it crushes or crumples the RFID tag. In such a device, a housing may be vacuum sealed with a sealed hose extending from the bottom end of the housing. Cutting the hose would introduce air pressure into the housing thereby forcing the disabling member upwards, thereby crushing the RFID tag.

Figure 3:
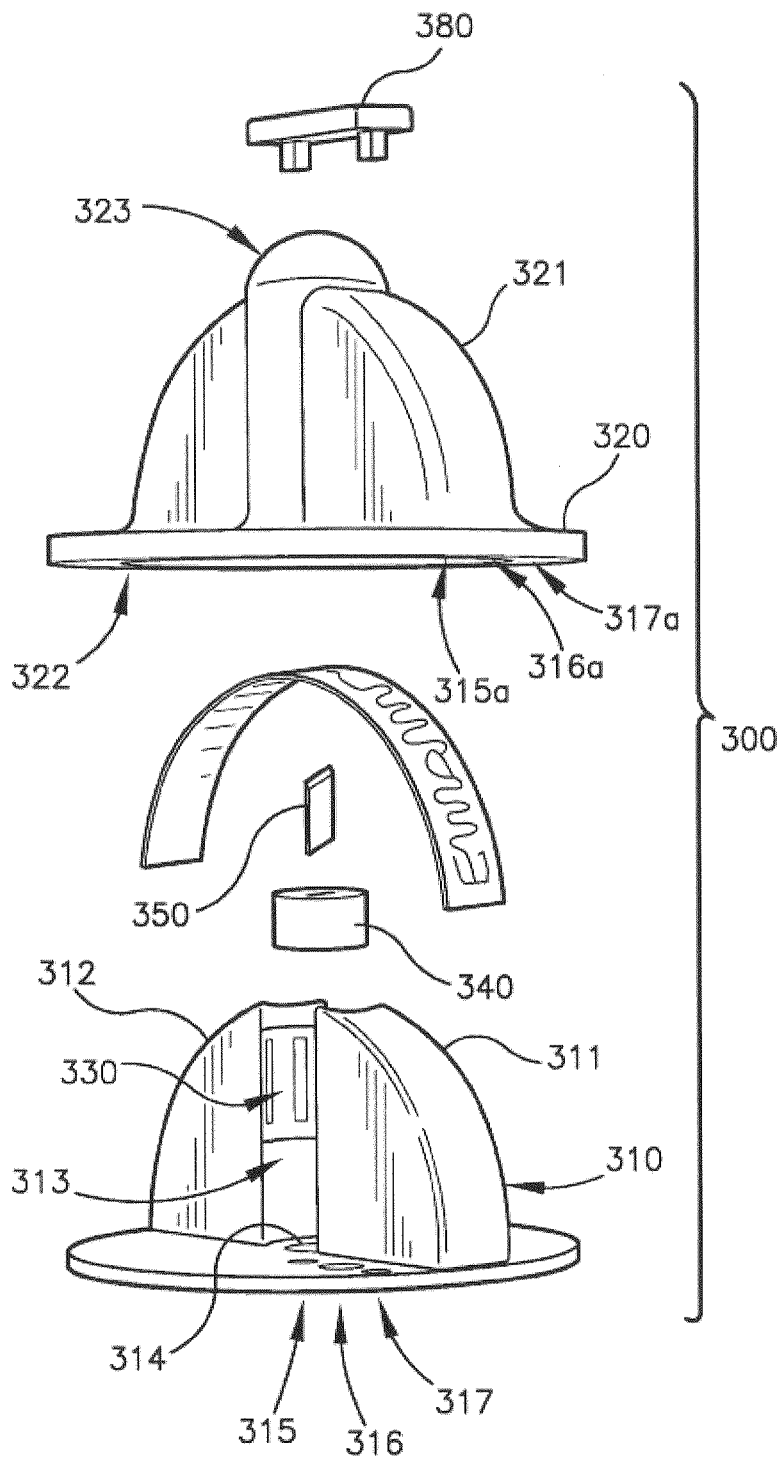
FIG. 3 illustrates an exploded side perspective view of another example RFID locking apparatus.
Figure 3A:
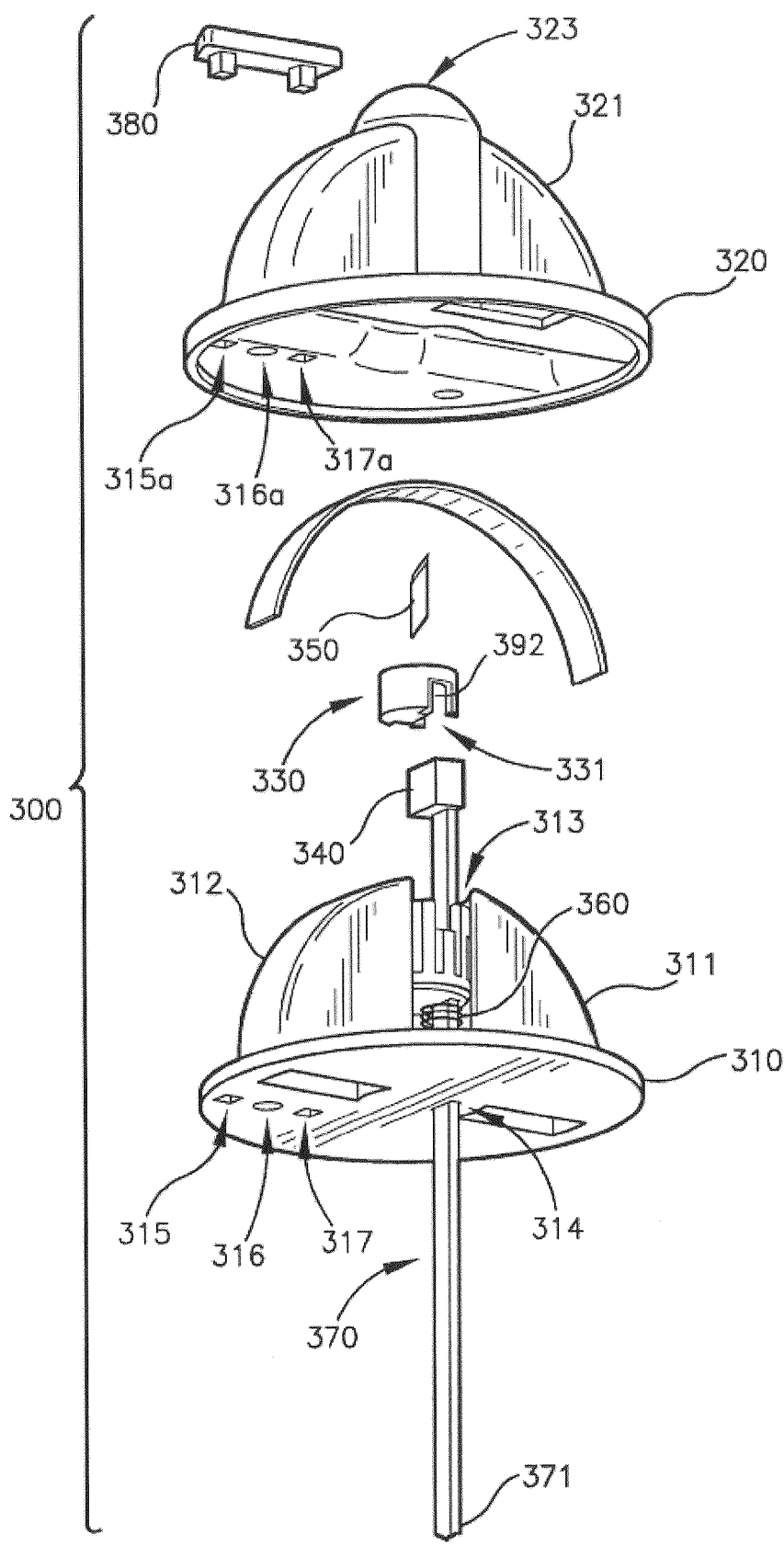
FIG. 3A shows an exploded bottom perspective of the RFID locking apparatus of FIG. 3.

Referring now to FIG. 3 and FIG. 3A, another example implementation of the RFID locking apparatus is shown. The RFID locking apparatus 300 comprises: a foundation 310, a cover 320; a fastener end container 330; a blade holder 340, a blade 350, a spring 360, a fastener 370, and a one-way ratchet fastener lock 380. In the implementation shown in FIG. 3 and FIG. 3A, the disabling member comprises the blade 350 and the locking member comprises the fastener 370 and the one-way ratchet fastener lock 380.

The foundation 310 may be made of any suitable material that is weatherproof and resistant to easy breakage including, but not limited to, metal, plastic or ceramic. For example, in one implementation, the foundation 310 is formed from a hard plastic substance such as polyethylene and has a disc shaped bottom base that is generally flat on its bottom surface. In other implementations, the bottom base of the foundation 310 may be square, rectangular, oval, or any other shape suited for use in a particular industry. In one implementation, the foundation 310 has two raised circular sectors 311, 312 extending from the top surface of its disc shaped bottom base. In other implementations, the foundation 310 may have two matching rectangular or square cuboids. The circular sectors 311, 312 are separated by a gap 313. The gap 313 when covered by a raised semicircular wedge 321 of the cover 320, forms a passageway that restricts the lateral movement of the fastener end container 330, the blade holder 340, and the blade 350 such that the fastener end container 330, blade holder 340, and blade 350 may move vertically but not horizontally. In one implementation, the foundation 310 has a fastener hole 314 extending through its disc shaped bottom base and located between its two raised circular sectors 311, 312 in the area of the gap 313. The foundation 310 may also have locking holes 315, 316, 317 that extend through its disc shaped bottom base.

The shape of the cover 320 is adapted such that it generally matches the shape of the raised surface of the foundation 310, for example, the raised circular sectors 311, 312. In one implementation, the shape of the cover 320 is made so that it tightly encloses the two raised circular sectors 311, 312 and the top surface of the disc shaped bottom base of the foundation 310. In other implementations, the cover 320 is shaped such that it tightly encloses any raised structures on the top surface of the foundation 310. In one implementation, the cover 320 has a disc shaped bottom base and a raised hollow semicircular wedge 321 extending from the top surface of the disc shaped bottom base. As shown in FIG. 3A, when viewed from the bottom of the cover 320, the hollow semicircular wedge 321 forms a cavity that accepts the two raised circular sectors 311, 312 of the foundation 310. The cover 320 may also have a portal through its disc shaped bottom surface that allows an identifying number as described herein, such as a bar code number, placed on the foundation 310 to be read. The cover 320 may be made of any suitable material that is weatherproof and resistant to easy breakage including but not limited to metal, plastic or ceramic. The material used to fashion the cover 320 and the foundation 310 is made from any suitable material that allows a signal to be detected from an RFID tag. In one implementation, the semicircular wedge 321 of the cover 320 has a dome 323, which accepts the fastener end container 330, the blade 350, and the blade holder 340 in the event that the disabling member disables the RFID tag, as described herein. The cover 320 may have also have locking holes 315a, 316a, 317a that extend through the surface of its disc shaped bottom base and that match and correspond to the locking holes 315, 316, 317 of the foundation 310.

The spring 360 may be any suitable helical compression spring or similar mechanism. When compressed into a loaded state, the spring 360 will exert a force on a bottom surface of the fastener end container 330 and the blade holder 350, directly or indirectly. Once the spring 360 is released from the loaded state, the force will drive the blade 350 into the RFID tag, destroying an antenna and/or a chip of the RFID tag, as described in more detail below.

The fastener 370 made of any suitable material such as plastic or metal. In one implementation, a non-fastening end 371 of the fastener 370 is guided through an opening 331 located in the bottom of the fastener end container 330. The fastener end container 330 may be fashioned in the form of a cup shape having an open top, raised sides and a bottom. However, other shapes are contemplated. The opening 331 in the bottom of the fastener end container 330 is of sufficient dimensions to allow a non-fastening end 371 of the fastener 370 to pass through, as well as the entire length and diameter of the fastener 370, except for a fastening end 372. Such a design allows a user to freely pull on the fastener 370 until the fastening end 372 engages the opening 331. Once this occurs, since the fastening end 372 may not be pulled through the opening 331 of the fastening end container 330, further pulling of the fastener 370 will force the fastener end container 330 to load or compress the spring 360 placed in the gap 313.

The spring 360 is placed in the area formed by the gap 313 of the foundation 310. The non-fastening end 372 of the fastener 370 is guided through a central diameter of the spring 360 and through a fastener hole 314 located in the surface of the foundation 310. The blade holder 340 and blade 350 may also fit in or be attached to the fastener end holder 330. The blade holder 340 may be of any suitable shape that fits within or attaches to the open cup space of the fastener end holder 330. For example, the blade holder 340 may take the shape of a semi-cylindrical wedge with a groove formed to accept the blade 350. The blade 350 is attached to the blade holder 340 by any suitable means including, but not limited to, gluing or welding. Moreover, the blade holder 340 may be attached to the fastener end container 330 through any suitable means including, but not limited to, gluing or welding.

To set the RFID locking apparatus in a loaded state, the non-fastening end 372 of the fastener 370 is pulled until a tip of the blade 350 is below an area of the gap 313 spanning the highest points of the two raised circular sectors 311, 312. In one implementation, the non-fastening end 372 of the fastener 370 is pulled away from the bottom surface of the foundation 310 until the fastener end container 330 can no longer travel in a downward direction away from the dome 323 of the cover 320 and the blade 350 is at its furthest location away from the dome 323.

Figure 4:
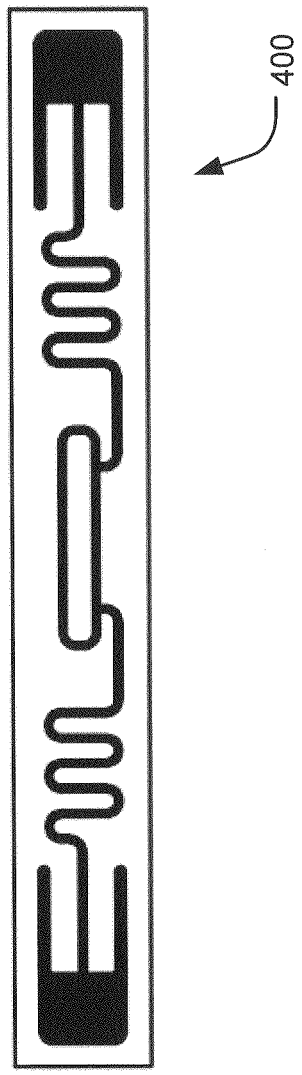
FIG. 4 illustrates a top view of an example RFID tag that may be utilized according to the presently disclosed technology.

An RFID tag, for example RFID tag 400 shown in FIG. 4, may be utilized in one or more of the implementations shown in FIG. 1 to FIG. 3A. In one implementation, the RFID tag 400 has an adhesive on one side. As shown in FIG. 3 and FIG. 3A, the RFID tag 400 may be placed with the adhesive side facing surfaces of the curved arcs of the two raised circular sectors 311, 312. Proper placement of the RFID tag 400 will result in a majority of the RFID tag 400 adhering to the surface of the curved arcs of the two raised circular sectors 311, 312 and a portion of the RFID tag 400, which is not adhered to the surface of the curved arcs, tautly spanning a top of the gap 313 between the two raised circular sectors 311, 312. The cover 320 of the RFID locking apparatus 300 may be placed over the foundation 310 so that the locking holes 315a, 316a, 317a match the locking holes 315, 316, 317 on the foundation 310 and the RFID tag 400 is secured inside the RFID locking apparatus 300.

In one implementation, the one-way ratchet fastener lock 380 may be placed in locking holes 315a and 317a. Securing means such as bolts, rivets, or screws may be used to secure the one-way ratchet fastener lock 380, the cover 320, and the foundation 310 tightly together. Care must be taken so that a user does not allow the fastener end container 330 holding the blade 350 to move back in a direction towards the dome 323 after the RFID tag 400 is adhered to the surfaces of the curved arcs of the two raised circular sectors 311, 312. Releasing the fastener 370 will result in a triggering event that disables the RFID tag 400. Releasing the non-fastening end 371 of the fastener 370 will cause the spring 360 to unload and thereby thrust the fastening end container 330, blade 350, and blade holder 340 in a direction towards the dome 323 of the cover 320. The blade 350 that is employed is sufficiently sharp and configured so that it will substantially cut an antenna and/or chip portion of the RFID tag 400 that tautly spans the gap 313. Cutting the RFID tag 400 will result in its disablement so that an RFID tag reader will be unable to discern a signal emitted from the RFID tag 400.

Taking care that the blade 350 does not cut the RFID tag 400, in one implementation, the non-fastening end 372 of the fastener 370 is guided through, for example, the metal rings of a door or hatch that secures goods or assets. The fastener 370 is guided through the locking holes 316, 316a from the bottom surface of the foundation 310, through to the top surface of the cover 320. In another implementation, a one-way ratchet locking washer, such as the one shown and described in FIG. 2, may be employed directly beneath the bottom surface of the foundation 310 to attach the RFID locking apparatus 300 to the door or hatch securing the goods or assets and to prevent the fastener 370 from moving back in the direction of the RFID locking apparatus 300. As explained previously, the fastener 370 has ratchets that ensure it will not move in reverse direction once it is pulled through the one-way ratchet fastener lock 380. The fastener 370 is pulled until there is no slack left in the fastener 370 between the RFID locking apparatus 300, the door or hatch to be secured, and the fastener lock 380.

Once the fastener 370 is secured with the fastener lock 380, if the RFID locking apparatus 300 is tampered with by cutting the area of the fastener 370 between the one-way ratchet fastener lock 380 and the bottom of the foundation 310, the spring 360 will unload and thrust the blade 350 through the portion of the RFID tag 400 spanning the gap 313 between the two raised circular sectors 311, 312. This in turn will disable the RFID tag 400. Once a truck, for example, passes through an RFID reader gate, it will be quickly and easily known that the RFID locking apparatus 300 has been tampered with and potentially harmful activities may have occurred because a signal will not be detected from the RFID tag 400.

Figure 5:
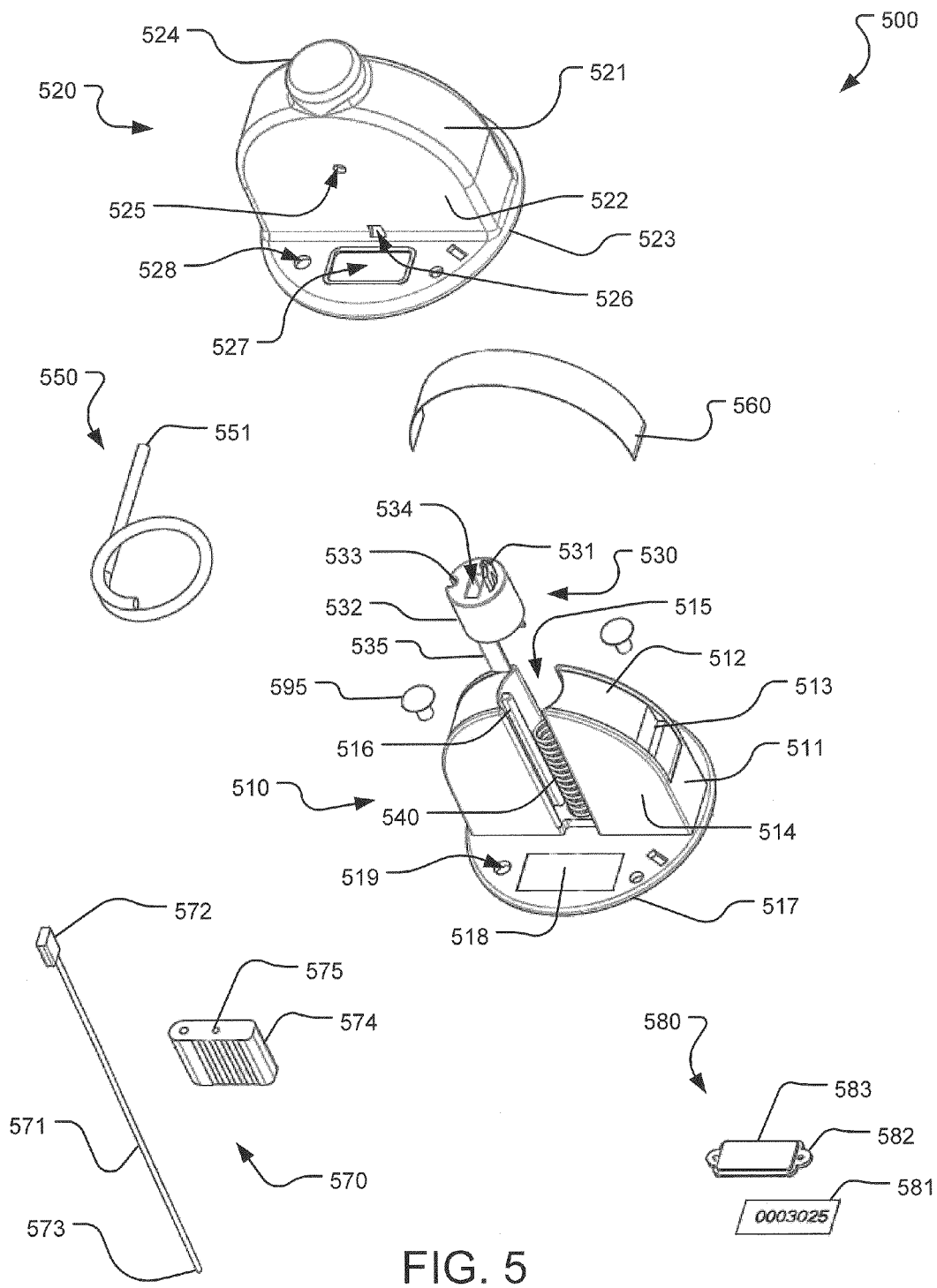
FIG. 5 illustrates an exploded top perspective view of another example RFID locking apparatus.

FIG. 5 illustrates an exploded view of another implementation of the RFID locking apparatus. As shown in FIG. 5, an RFID locking apparatus 500 includes a foundation 510, a cover 520, a disabling member 530, a spring 540, a pin 550, an RFID tag 560, and a locking member 570.

In one implementation, the foundation 510 includes one or more extruding sectors, each having a top surface 511, side surfaces 514, and a base 517. The cover 520 is shaped to generally mirror the shape of the foundation 510. For example, in one implementation, the cover includes a top surface 521, side surfaces 522, and a base 523 shaped to generally mirror the top surface 511, the side surfaces 514, and the base 517 of the foundation 510, respectively.

The foundation 510 is adapted to engage the cover 520 to form a housing, which secures the disabling member 530, the spring 540, and the RFID tag 560. For example, the RFID locking apparatus 500 may include one or more screws 590 that may secure the foundation 510 to the cover 520 through locking holes 519 and 528. As described herein, the RFID tag 560 has a chip and an antenna configured to emit a signal that may be received by an RFID reader. The RFID tag 560 may have, for example, the characteristics of the RFID tag 400, including an adhesive on one or more sides. However, other characteristics are contemplated.

In one implementation, the top surface 511 includes a channel 512 defined therein. The channel 512 is adapted to receive and place the RFID tag 560 relative to the disabling member 530, such that the antenna and/or the chip of the RFID tag 560 will be destroyed in response to damage to the locking member 570. For example, the extruding sectors may form a gap 515 within which the disabling member 530 and the spring 540 move. The RFID tag 560 is placed in the channel 512 of each of the extruding sectors such that at least a portion of the antenna and/or the chip of the RFID tag 560 spans the gap 515. The channel 512 may include one or more snugs 513 to hold the RFID tag 560 firmly within the channel 512. The snugs 513 ensure that the antenna and/or the chip of the RFID tag 560 is destroyed by the disabling member 530 rather than being merely displaced as the disabling member 530 contacts the RFID tag 560.

The RFID tag 560 is associated with an identification number, as described herein. In one implementation, the RFID locking apparatus 500 includes a label display 580 to display a label 581 containing the identification number. The label display 580 includes a window 583 made from a substantially transparent, robust material, including but not limited to plastic or glass, through which the label 581 may be read. The window 583 protects the label 581 from damage caused by environmental factors or from harmful activities. For example, the window 583 prevents someone from removing and replacing the label 581 to conceal that harmful activities have taken place. In one implementation, the foundation 510 includes a surface 518 upon which the label 518 may be placed. The label 518 may include an adhesive on one side to adhere the label 518 to the surface 518. Alternatively or additionally, the foundation 510 may include one or more securing members to hold the label 518 on the surface 518. The cover 520 may include a portal 527 placed relative to the surface 518 on the foundation 510 through which the label 518 may be displayed. In one implementation, the label display 580 includes engaging members 582 configured to engage corresponding members on the foundation 510 or the cover 520 to hold the label display 580 in place.

In one implementation, the locking member 570 includes a fastener 571 and a fastener catcher 574. In one implementation, the fastener catcher 574 is positioned in a holder extruding from the base 517 of the foundation 510. The fastener 571 is a substantially flexible, robust material, such as plastic or metal. To arm the RFID locking apparatus 500, a non-fastening end 573 of the fastener 571 is guided through an opening 534 in the disabling member 530, a central diameter in the spring 540, and a fastener hole in the foundation 510. The opening 534 in the disabling member 530 is sized and shaped to permit the length of the fastener 571 to move through the disabling member 530 until a fastening end 572 engages with a surface in the opening 534. Once the fastening end 572 engages with the opening 534, the fastener 571 is pulled to compress the spring 540 into a loaded state. In other words, the disabling member 530 is placed relative to the spring 540 such that the force exerted on the disabling member 530 when the fastener 571 is pulled compresses the spring 540 into the loaded state.

In one implementation, the disabling member 530 and the spring 540 are placed in the gap 515. The gap 515 restricts lateral movement of the disabling member 530 and the spring 540, such that the disabling member 530 and the spring 540 move vertically within the gap 515 but not horizontally. At least one of the extruding sectors of the foundation 510 may include a track 516 adapted to engage a channel 533 in the disabling member 530 to restrict movement of the disabling member 530 to the length of the track 516. Further, the disabling member 530 may include one or more legs 535 that extrude from a body 525 of the disabling member 530 and cover a portion of the spring 540 when the disabling member 530 is placed relative to the spring 540. The legs 535 and the track 516 ensure that a puncturing member 531 remains firmly aimed at the RFID tag 560 during movement.

Once the spring 540 is compressed into the loaded state, the RFID tag 560 is placed on the channel 512 such that the antenna and/or the chip of the RFID tag 560 spans the gap 515 and the disabling member 530 is positioned relative to the antenna and/or the chip of the RFID tag 560. Specifically, the disabling member 530 is positioned to destroy the antenna and/or the chip, such that a signal cannot be emitted, upon release of the spring 540 from the loaded state in response to a portion of a locking member 570 being damaged.

In one implementation, after the RFID tag 560 is placed, the cover 520 is placed to engage the foundation 510. An inserting end 551 of the pin 550 may be guided through an arming hole 525 in the cover 520 to hold the spring 540 in the loaded state. The cover 520 may include an indicator 526 that identifies whether the RFID locking apparatus 500 is armed with the spring 540 in the loaded state. For example, the indicator 526 may display a color or other visual cue indicating that the RFID locking apparatus 500 is armed. In one implementation, the indicator 526 is an opening in the cover 520 through which a color or other visual cue may be displayed. The RFID locking apparatus 500 may be armed during manufacturing, assembly, or on-site during use. Arming the RFID locking apparatus 500 during assembly allows for more efficient and error proof installation.

During installation, the non-fastening end 573 of the fastener 571 is guided through a portion of an object securing an opening to the goods or assets to engage the locking member 570. For example, the goods or assets may be secured by a door or hatch having rings, as described herein. The non-fastening end 573 is guided through a central diameter of the ring and through a hole 575 in the fastener catcher 574. The fastener catcher 574 locks the fastener 571 in place, preventing the fastener 571 from moving in a reverse direction back through the fastener hole in the foundation 510. The fastener 571 is pulled until there is no slack left in the fastener 571 between the fastener hole in the foundation 510 and the fastener catcher 574. Once the locking member 570 is engaged, the pin 550 is removed, installing the RFID locking apparatus 500 for use. In some implementations, the RFID locking apparatus 500 may include a seal that is configured to break when the pin 550 is removed to confirm that the RFID locking apparatus 500 was not tampered with prior to installation.

Once the RFID locking apparatus 500 is installed, if the RFID locking apparatus 500 is tampered with by damaging a portion of the locking member 570, for example by severing part of the exposed area of the fastener 571, the spring 540 is released from the loaded state causing the disabling member 530 to destroy the antenna and/or the chip of the RFID tag 560, such that a signal cannot be emitted. In one implementation, releasing the spring 540 from the loaded state thrusts the disabling member 530 towards the RFID tag 560 causing the puncturing member 531 to puncture or otherwise sever a portion of the RFID tag 560, thereby destroying the antenna and/or the chip of the RFID tag 560.

In one implementation, the cover 520 includes a dome 524 which accepts the disabling member 530 once the spring 540 is released. The dome 524 may include one or more ribs to prevent the puncturing member 571 from damaging the cover 520. After use, the RFID tag 560 and the label 581 may be disposed and the remaining components of the RFID locking apparatus 500 may be recycled or reused.

Figure 6A:
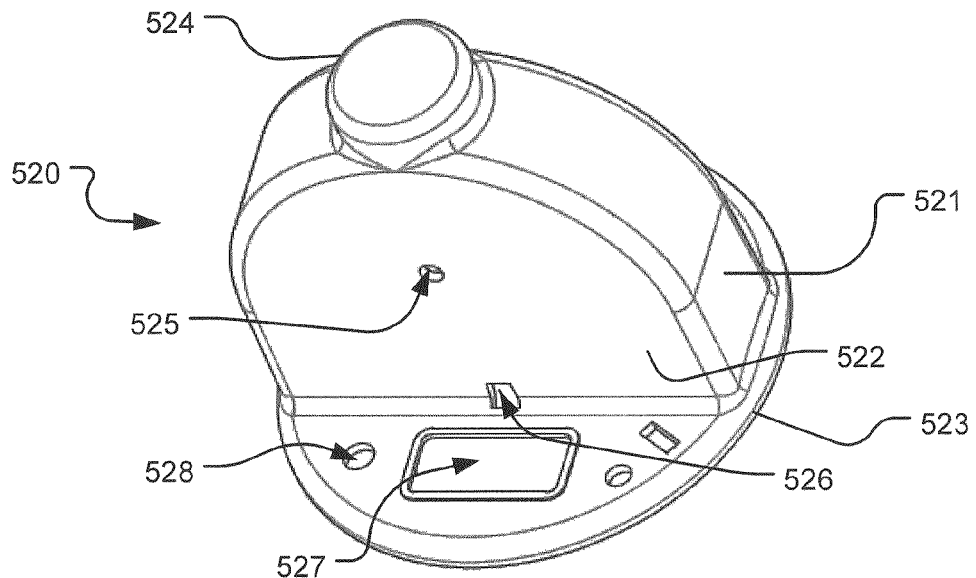
FIGS. 6A and 6B show top and bottom perspective views, respectively, of an example cover of the RFID locking apparatus of FIG. 5.
Figure 6B:
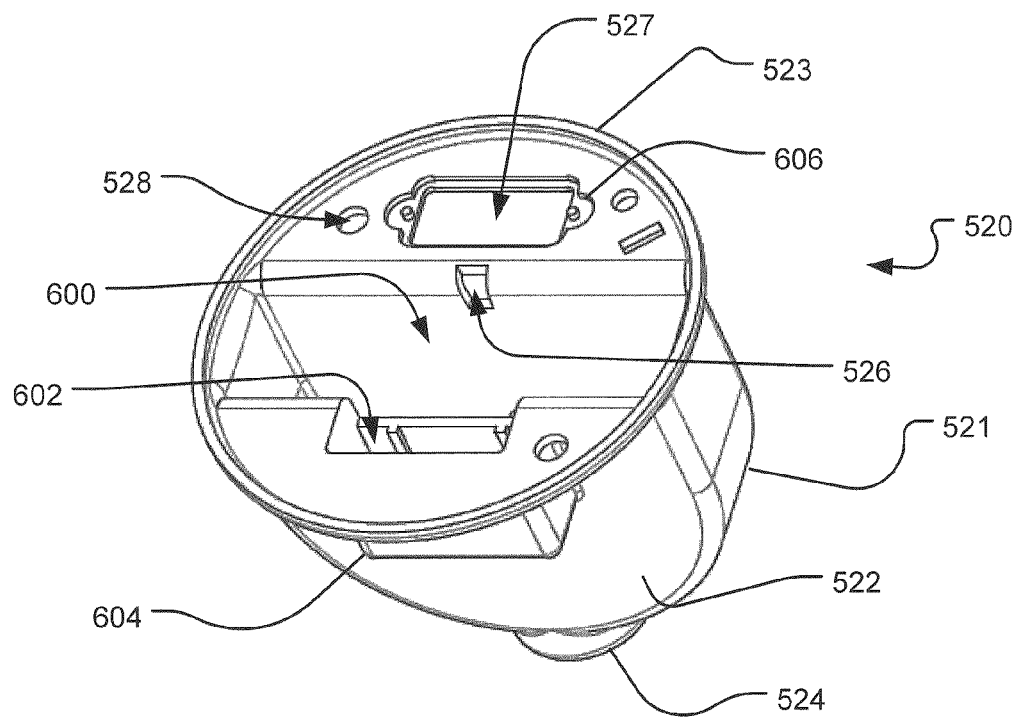

FIGS. 6A and 6B show top and bottom perspective views, respectively, of the cover 520. The cover 520 may be made from a substantially robust, weatherproof material, including but not limited to metal, plastic, or ceramic, that permits the signal emitted from the RFID tag 560 to be detected by an RFID reader.

As detailed with respect to FIG. 5, the shape and size of the cover 520 is mirrored to match the size and shape of the foundation 510. In one implementation, the base 523 has a disk shape, the top surface 521 is generally curved, the dome 524 is generally cylindrical, and the side surfaces 524 are generally flat. The top surface 521 and the side surfaces 524 form a semicircular wedge extruding from the base 523. In other implementations, the top surface 521 and/or the side surfaces 524 may have surface(s) that are contoured, planar, flat, angled, or some combination of them. The dome 524 may be generally spherical, rectangular, conical, elliptical, or pyramidal. However, other shapes are contemplated. In one implementation, the cover 520 is approximately 2.5 to 3.0 inches as measured from the base 523 to a highest point on the dome 524 and approximately 2.0 to 2.5 inches as measured from the base 523 to a lowest point (e.g., at one of the ribs) on the dome 524. In one particular implementation, the cover 520 is approximately 2.640 inches as measured from the base 523 to a highest point on the dome 524 and approximately 2.125 inches as measured from the base 523 to a lowest point (e.g., at one of the ribs) on the dome 524.

In one implementation, the cover 520 includes a first cavity 600 adapted to receive the extruding sectors of the foundation 510 and a fastener catcher housing 604 having a second cavity 602 adapted to receive the fastener catcher 574. In another implementation, a single cavity in the cover 520 may be adapted to receive both the extruding sectors of the foundation 510 and the fastener catcher 574.

As detailed with respect to FIG. 5, the cover 520 may include engaging members 606 in the base 523 configured to engage the engaging members 582 of the label display 580 to hold the label display 580 in place.

Figure 7A:
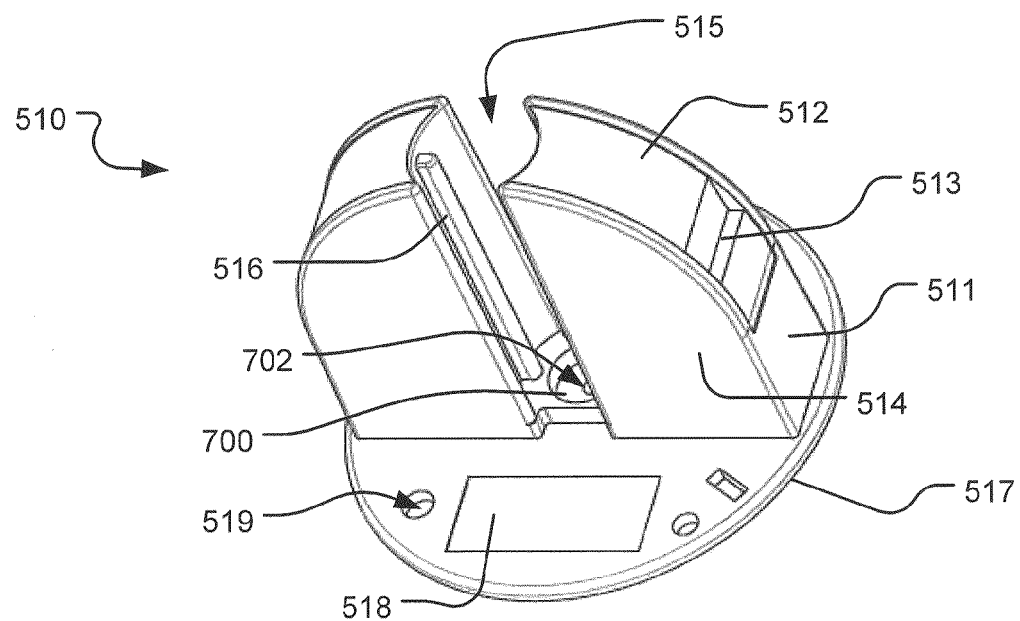
FIGS. 7A and 7B are top and bottom perspective views, respectively, of an example foundation of the RFID locking apparatus of FIG. 5.
Figure 7B:
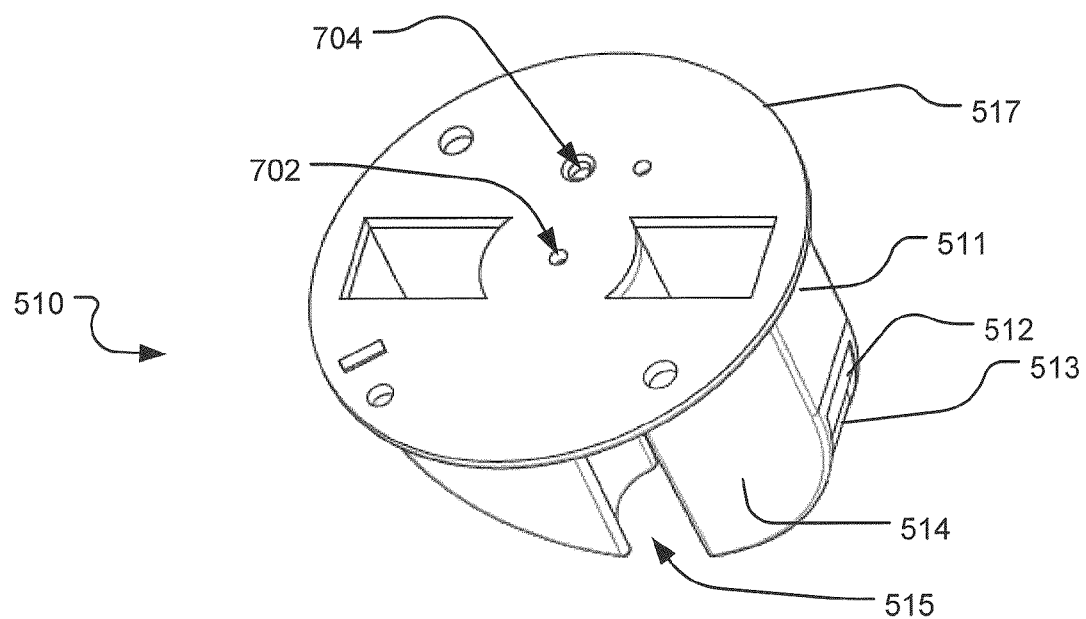

As shown in FIGS. 7A and 7B, which are top and bottom perspective views, respectively, of the foundation 510, in one implementation, the base 517 includes an extruded member 700 adapted to position the spring 540 over a first fastening hole 702 in the base 517. As described with respect to FIG. 5, during arming and installation the non-fastening end 573 of the fastener 571 is guided through the first fastening hole 702 and a second fastening hole 704 in the base 517, which is positioned relative to the hole 575 in the fastener catcher 574.

The foundation 510 may be made from a substantially robust, material, including but not limited to metal, plastic, or ceramic. In one implementation, the top surface 511 is curved. In other implementations, the top surface 511 comprises one or more surfaces that are contoured, planar, flat, angled, or some other combination. In one implementation, the base 517 has a disk shape and the side surfaces 514 are generally flat. In other implementations, the base 517 and/or the side surfaces 524 may have surface(s) that are contoured, planar, flat, angled, or some combination of them. In one implementation, the foundation 510 is approximately 2.0 to 2.5 inches as measured from the base 517 to a highest point on the extruding sectors. In one particular implementation, the foundation 510 is approximately 2.220 inches as measured from the base 517 to a highest point on the extruding sectors. The dimensions of the foundation 510 are configured to maximize the thrust force created when the spring 540 is released from the loaded state while minimizing the overall volume of the RFID locking apparatus 500.

Figure 8A:
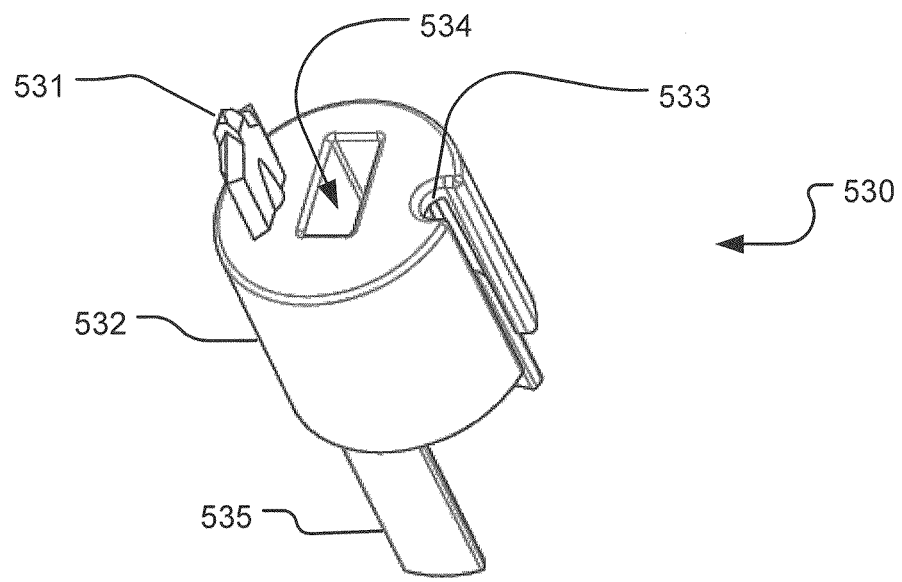
FIGS. 8A and 8B show top and bottom perspective views, respectively, of an example disabling member of the RFID locking apparatus of FIG. 5.
Figure 8B:
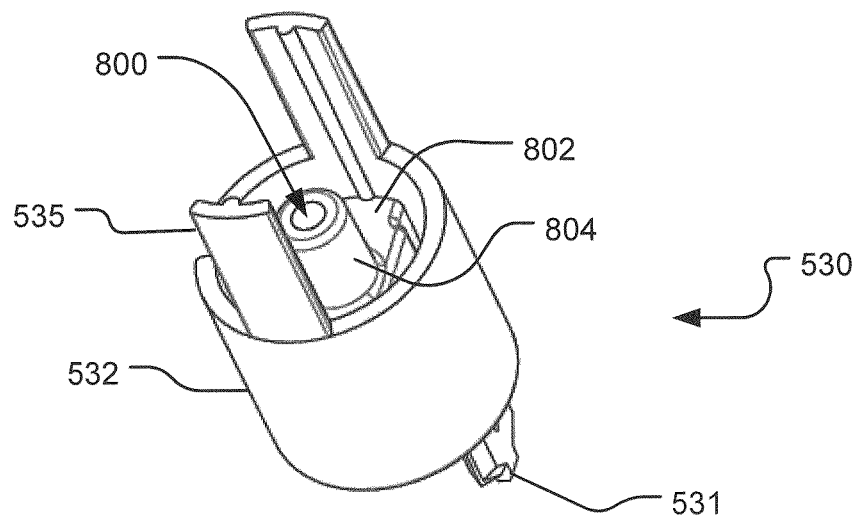

FIGS. 8A and 8B illustrate top and bottom perspective views, respectively, of the disabling member 530. In one implementation, the base 532 is substantially cylindrical in shape. In other implementations, the base 532 is generally spherical, rectangular, conical, elliptical, or pyramidal. In one implementation, the opening 534 and the legs 535 are generally rectangular in shape, and the channel 533 is contoured. However, other shapes are contemplated. The disabling member 530 is made from a substantially robust material, including, but not limited to, plastic, metal, ceramic, or glass.

As described with respect to FIG. 5, the base 532 includes an opening 534 defined therein. The opening 534 is sized and shaped to permit the length of the fastener 571 to move through a hole 800 until the fastening end 572 engages with a surface 802 in the opening 534. In one implementation, a fastening member 804 extrudes from the surface 802 to form the hole 800. Once the fastening end 572 engages with the opening 534, the fastener 571 is pulled to compress the spring 540 into the loaded state. In other words, the disabling member 530 is placed relative to the spring 540 such that the force exerted on the disabling member 530 when the fastener 571 is pulled exerts a force on the spring 540 from the surface 802 to compress the spring 540 into the loaded state. Similarly, once the spring 540 is released from the loaded state, the force exerted on the surface 802 by the spring 540 thrusts the puncturing member 531 into a portion of the RFID tag 560.

The puncturing member 531 is shaped to easily puncture, sever, or otherwise destroy the antenna and/or the chip of the RFID tag 560. In one implementation, the puncturing member 531 has a generally rectangular shape with a pointed, triangular tip. The puncturing member 531 may have a plurality of angled surfaces. In one implementation, the puncturing member 531 is approximately 0.25 to 0.3 inches wide, and the base 532 is approximately 0.625 to 0.675 inches tall. In a particular implementation, the puncturing member 531 is approximately 0.270 inches wide, and the base 532 is approximately 0.640 inches tall.

Figure 9:
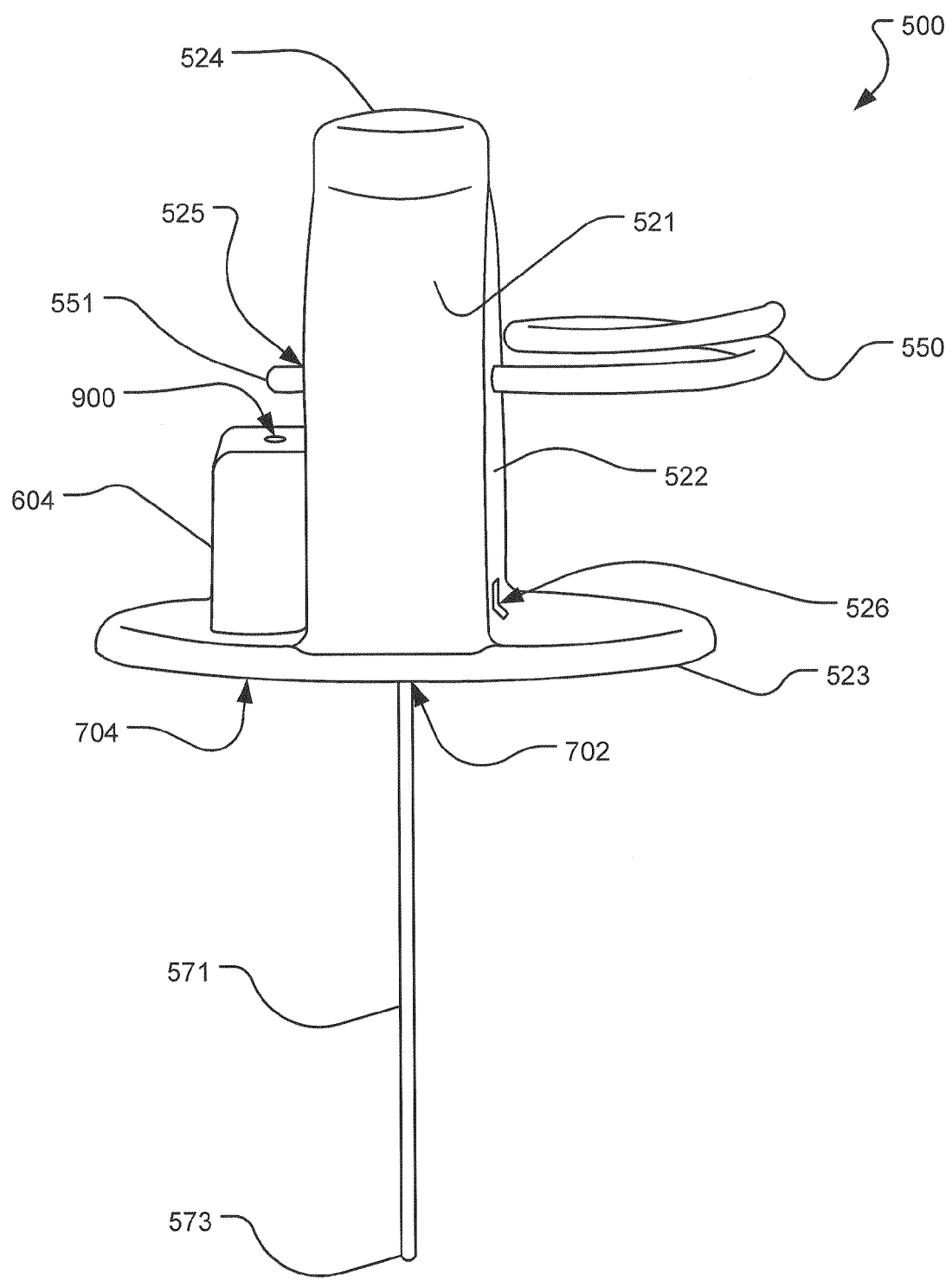
FIG. 9 illustrates a side perspective view of the RFID locking apparatus of FIG. 5 in a loaded state with a pin inserted.
Figure 10:
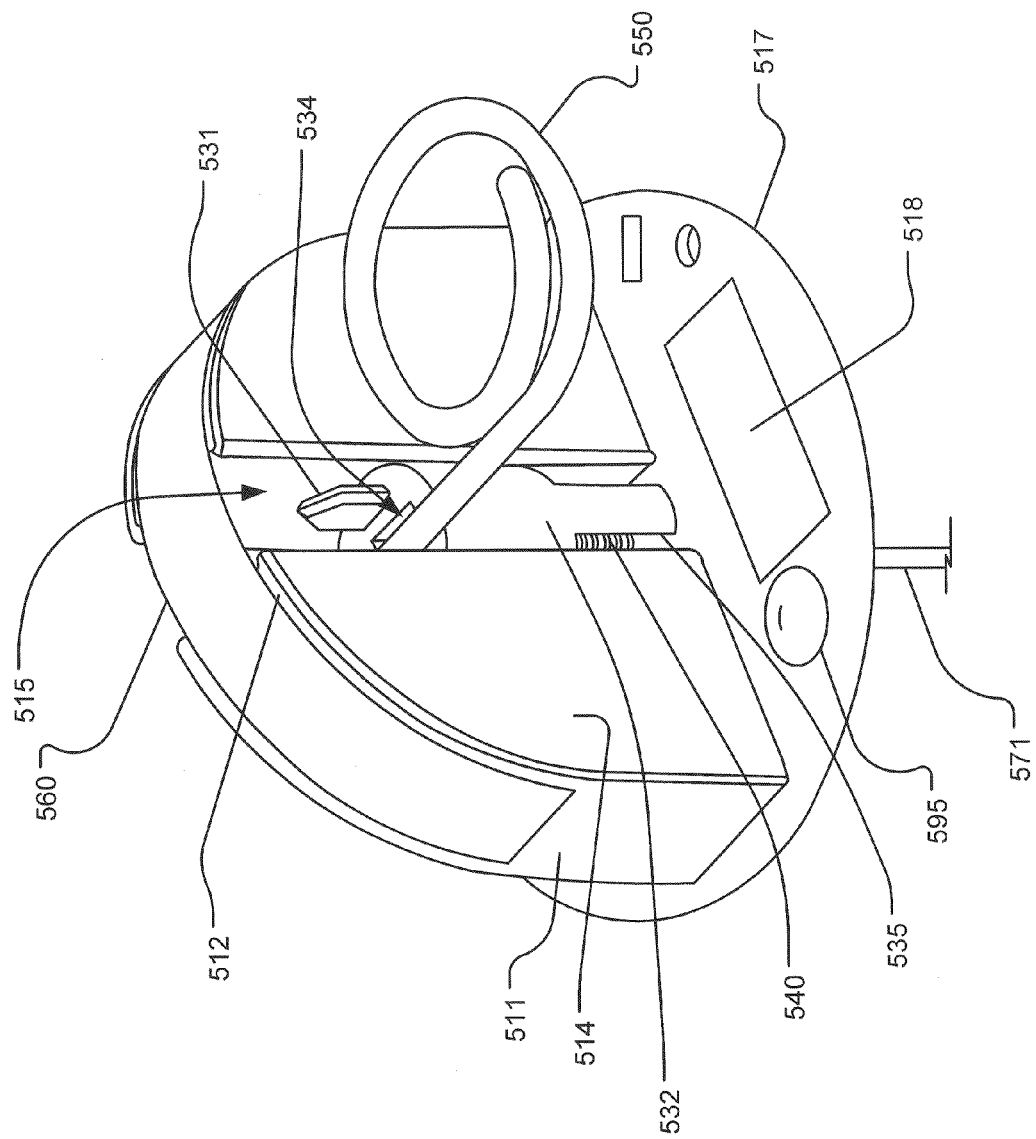
FIG. 10 illustrates a side perspective view of the RFID locking apparatus of FIG. 5 in a loaded state without the cover shown.

FIGS. 9 and 10 illustrate side perspective views of the RFID locking apparatus 500 in the loaded state with the pin 550 inserted, with and without the cover 520 shown, respectively. As described with respect to FIG. 5, the pin 550 is positioned in the arming hole 525 in the cover 520 to hold the spring 540 in the loaded state. In one implementation, the pin 550 is positioned over the base 532 of the disabling member 530 holding the spring 540 in the loaded state. In other words, the position of the pin 550 prevents the force exerted on the base 532 of the disabling member 530 by the spring 540 from moving the disabling member 530 towards the RFID tag 560.

Figure 11:
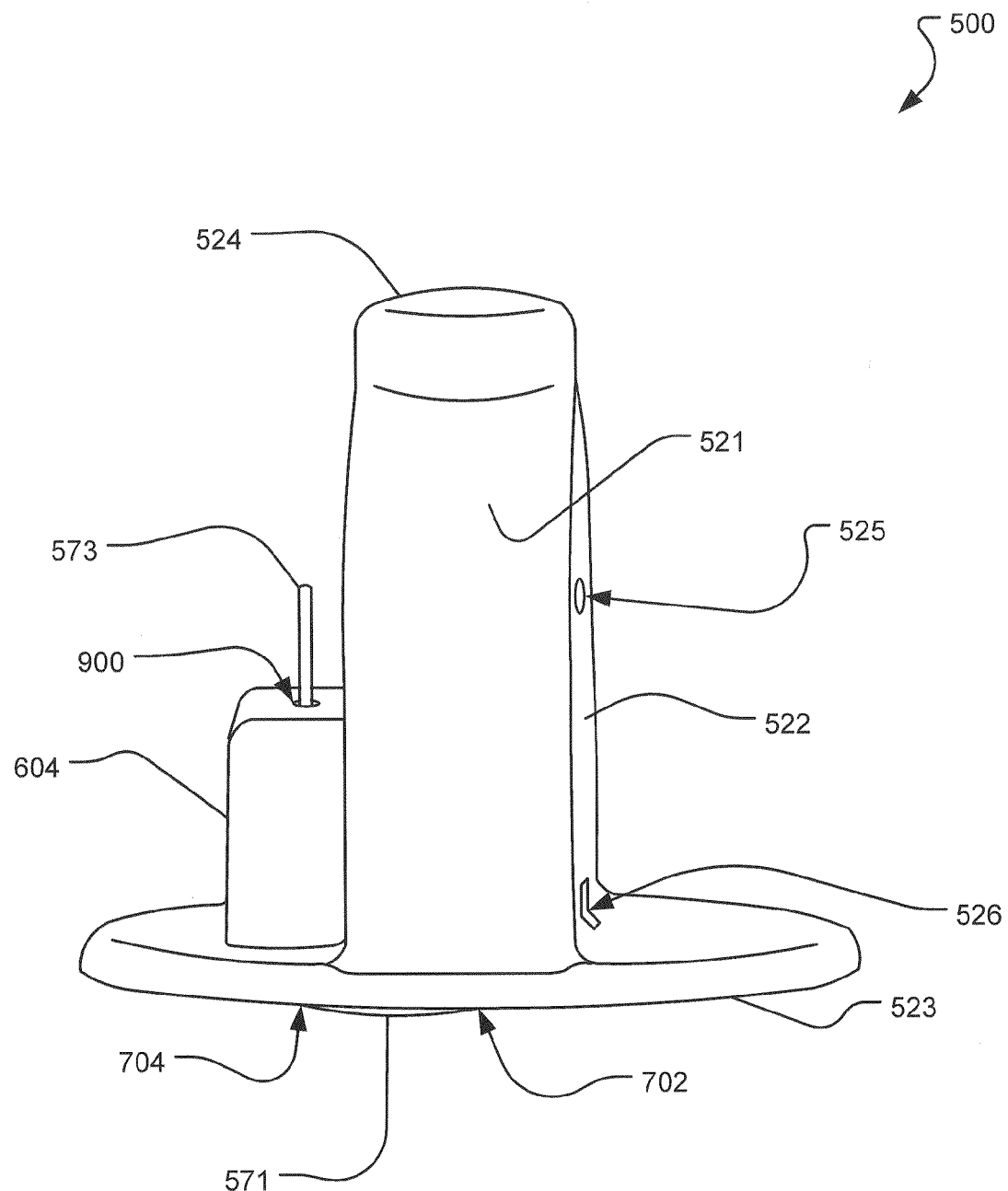
FIG. 11 illustrates the same view as FIG. 9 with the pin removed and a locking member engaged.

As shown in FIG. 9, in one implementation, the fastener catcher housing 604 includes a securing hole 900 through which the non-fastening end 573 of the fastener 571 may be guided to install the RFID locking apparatus 500. FIG. 11 illustrates the same view as FIG. 9 with the pin 550 removed and the locking member 570 engaged. As described with respect to FIG. 5, during installation, the non-fastening end 573 of the fastener 571 is guided through a portion of an object securing an opening to the goods or assets and through a hole 575 in the fastener catcher 574 to engage the locking member 570. In one implementation, the hole 575 in the fastener catcher 574 is positioned relative to the securing hole 900 in the fastener catcher housing 604. The fastener catcher 574 locks the fastener 571 in place, preventing the fastener 571 from moving in a reverse direction back through the fastener hole in the foundation 510. As shown in FIG. 11, the fastener 571 is pulled through the securing hole 900 until there is no slack left in the fastener 571 between the first fastener hole 702 and the second fastening hole 704 in the base 517 of the foundation 510. Once the locking member 570 is engaged, the pin 550 is removed, as shown in FIG. 11, installing the RFID locking apparatus 500 for use.

Figure 12:
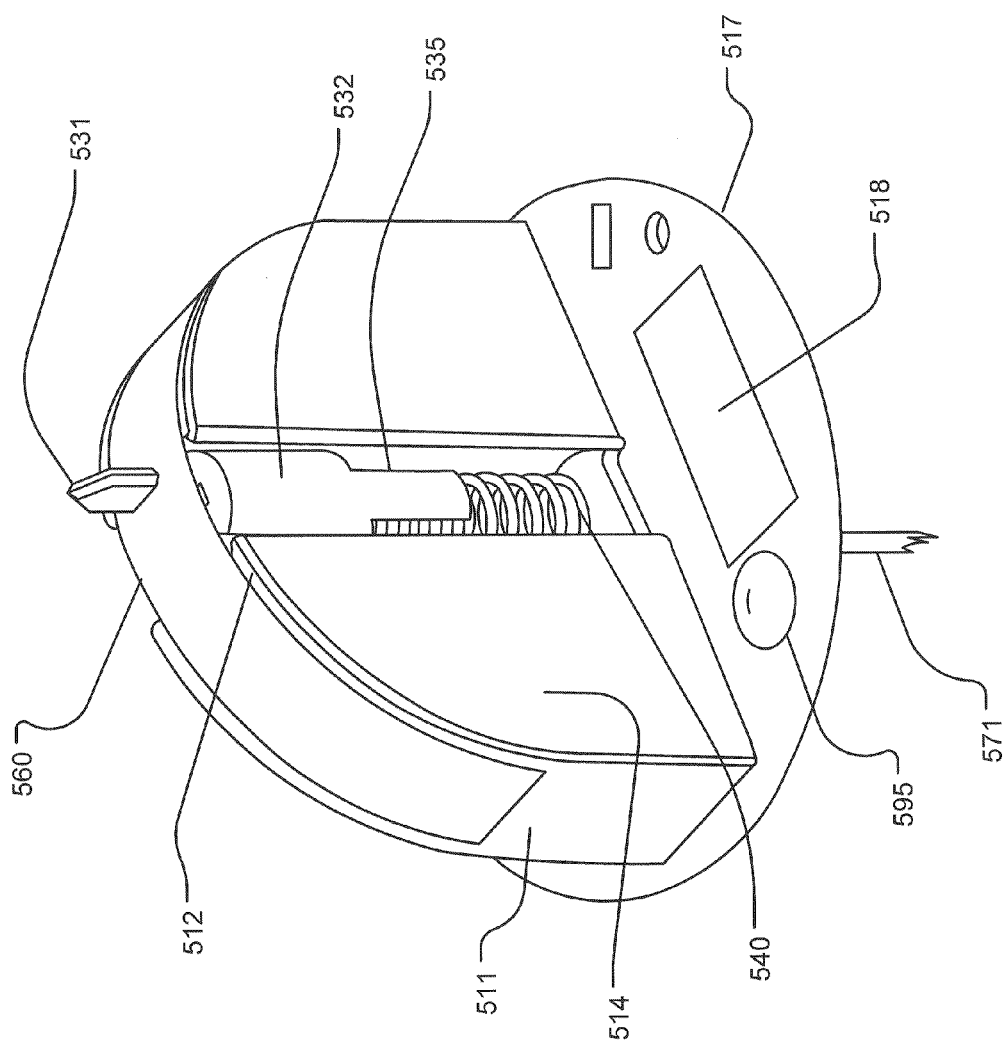
FIG. 12 illustrates a side perspective view of the RFID locking apparatus of FIG. 5 with a destroyed RFID tag and without the cover shown.

FIG. 12 illustrates a side perspective view of the RFID locking apparatus 500 with the RFID tag 560 destroyed and without the cover 520 shown for clarity. As described with respect to FIG. 5, once the RFID locking apparatus 500 is installed, if the RFID locking apparatus 500 is tampered with by damaging a portion of the locking member 570, for example by severing part of the exposed area of the fastener 571, as shown in FIG. 12, the spring 540 is released from the loaded state causing the disabling member 530 to destroy the antenna and/or the chip of the RFID tag 560, such that a signal cannot be emitted. In one implementation, releasing the spring 540 from the loaded state thrusts the disabling member 530 towards the RFID tag 560 causing the puncturing member 531 to puncture or otherwise sever a portion of the RFID tag 560, thereby destroying the antenna and/or the chip of the RFID tag 560, as shown in FIG. 12.

Figure 13:
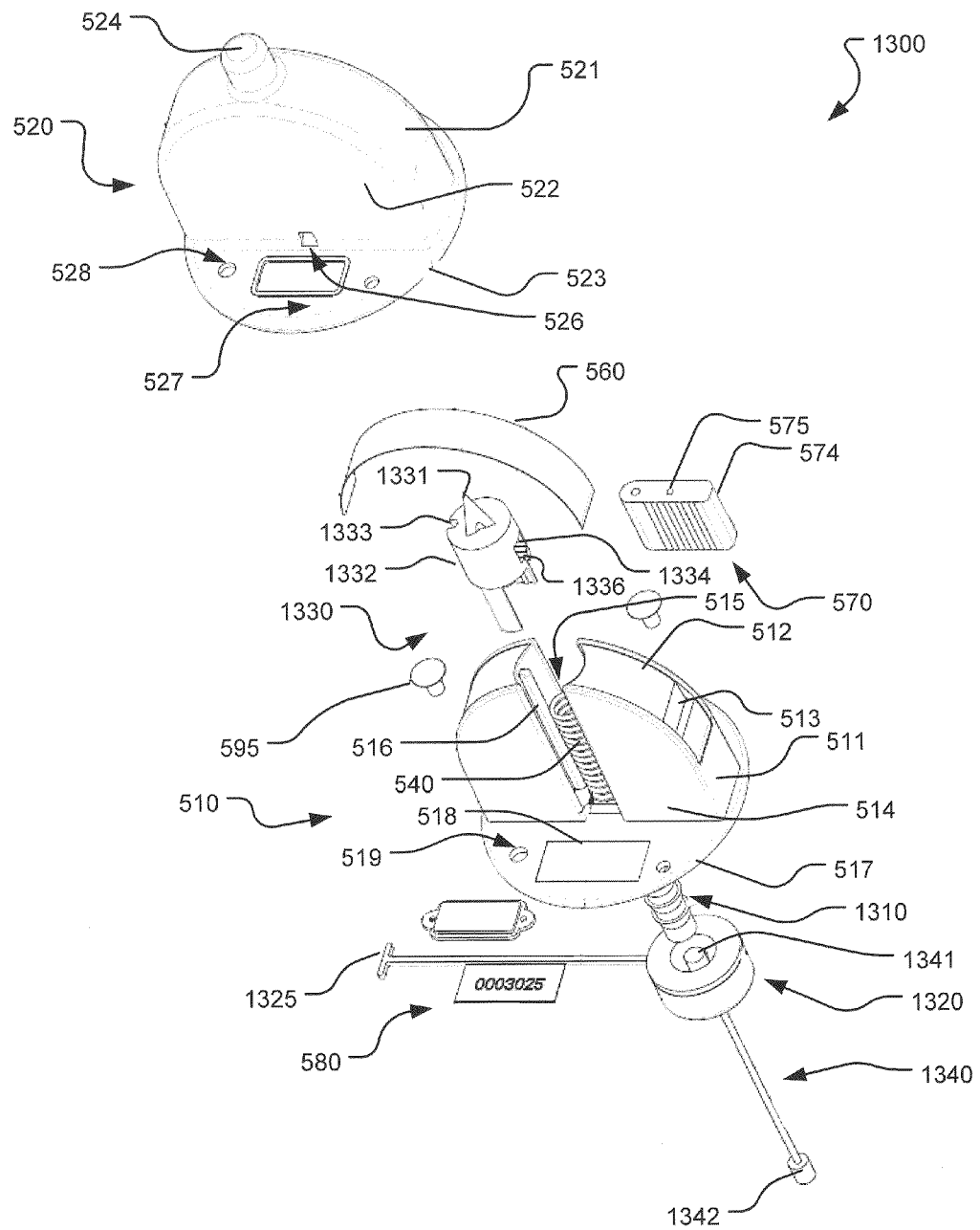
FIG. 13 illustrates an exploded top perspective view of another example RFID locking apparatus.

FIG. 13 illustrates an exploded view of another implementation of the RFID locking apparatus. As shown in FIG. 13, an RFID locking apparatus 1300 includes many of the same features and components as the RFID locking apparatus 500. For example, the RFID locking apparatus 1300 includes a foundation 510, a cover 520, a spring 540, an RFID tag 560, and a locking member 570. The RFID locking apparatus 1300 also includes a modified disabling member 1330 and a modified locking member that includes a ridged tube 1310, a retainer 1320 with a retainer handle 1325, and a cable 1340.

In one implementation, the disabling member 1330 and the spring 540 are placed in the gap 515. The gap 515 restricts lateral movement of the disabling member 1330 and the spring 540, such that the disabling member 1330 and the spring 540 move vertically within the gap 515 but not horizontally. At least one of the extruding sectors of the foundation 510 may include a track 516 adapted to engage a channel 1333 in the disabling member 1330 to restrict movement of the disabling member 1330 to the length of the track 516. Further, the disabling member 1330 may include one or more legs 1335 that extrude from a body 1332 of the disabling member 1330 and cover a portion of the spring 540 when the disabling member 1330 is placed relative to the spring 540. The legs 1335 and the track 516 ensure that a puncturing member 1331 remains firmly aimed at the RFID tag 560 during movement. The disabling member 1330 also includes a cavity 1334 and channel 1336 shaped to receive and securely fasten an insert end 1341 of the cable 1340. In this implementation, the cavity 1334 is generally cylindrical in shape and has a channel 1336 for receiving the insert end 1341 and for allowing for the cable 1340 to exit from the bottom of the disabling member 1330. The cable 1340 may be flexible or rigid and may be made from a variety of materials, including, without limitation, metal, plastic, ceramic, fabric, wood, and/or the like.

As with the RFID locking apparatus 500, the disabling member 1330 is positioned to destroy the antenna and/or the chip, such that a signal cannot be emitted, upon release of the spring 540. To arm the RFID locking apparatus 1300, the RFID locking apparatus 1300 utilizes the spring 540 along with the ridged tube 1310, the retainer 1320, the disabling member 1330, and the cable 1340 of the locking member.

In one implementation, to arm the RFID locking apparatus 1300, the cable 1340 is pulled down through the ridged tube 1310, thereby compressing the spring 540. The retainer 1320 is then engaged around the ridged tube. Stated differently, sliding the retainer 1320 along the ridged tube 1310 compresses the ridged tube and holds the cable 1340 in place. The RFID locking apparatus 1300 is armed and the cable 1340 is attached to a shipping container using the outer end 1342. If the cable 1340 or the retainer 1320 is tampered with, the spring 540 is released and the disabling member disables the RFID tag 560. A fastener 570 may also be used as a secondary locking mechanism for added security and/or configured to prevent the accidental disabling of the RFID tag 560.

The RFID tag 560 may then be placed and the cover 520 the cover 520 is positioned to engage the foundation 510. The cover 520 may include an indicator 526 that identifies whether the RFID locking apparatus 500 is armed with the spring 540 in the loaded state. For example, the indicator 526 may display a color or other visual cue indicating that the RFID locking apparatus 1300 is armed. In one implementation, the indicator 526 is an opening in the cover 520 through which a color or other visual cue may be displayed. The RFID locking apparatus 1300 may be armed during manufacturing, assembly, or on-site during use.

Figure 14:
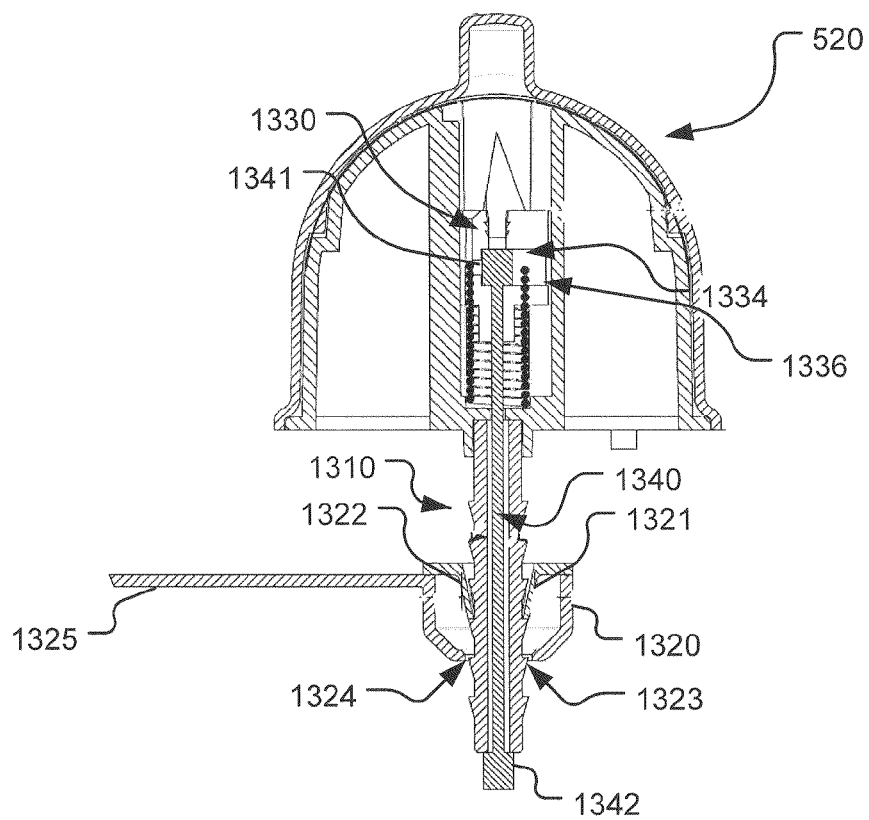
FIG. 14 illustrates a side perspective view of the RFID locking apparatus of FIG. 13 in a loaded state without the cover shown.
Figure 15:
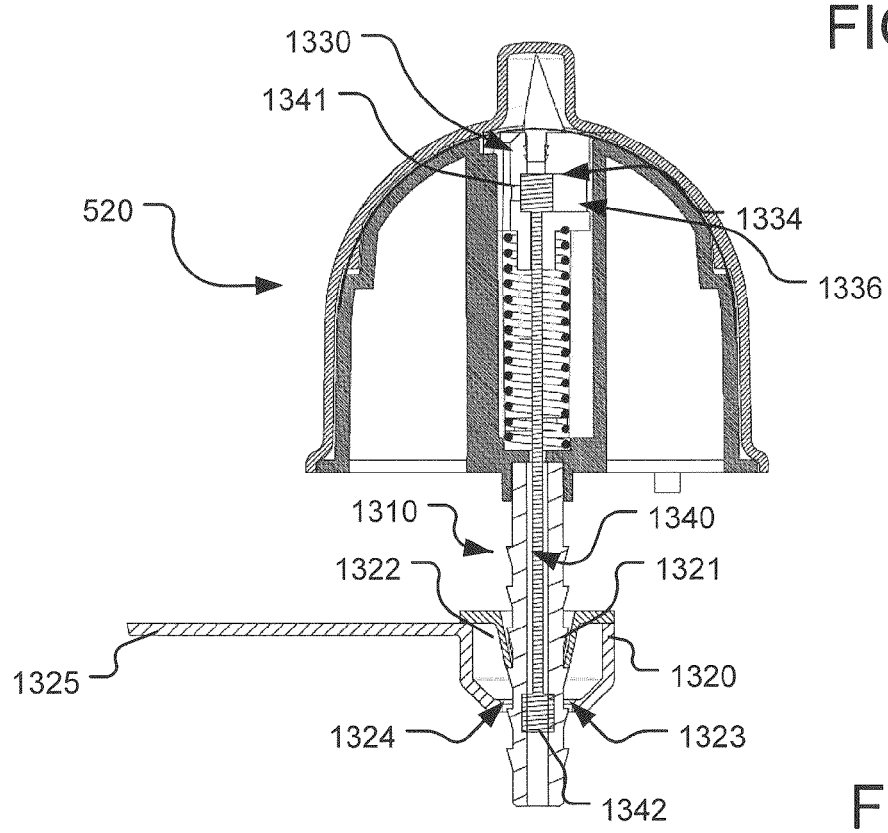
FIG. 15 illustrates a side perspective view of the RFID locking apparatus of FIG. 13 in a released state without the cover shown.

FIGS. 14 and 15 illustrate a side perspective view of the RFID locking apparatus of FIG. 13 in loaded and released states, respectively. The ridges of the ridged tube 1310 are relatively uniform in spacing and shape. The ridges extend outwards linearly, starting at a first outside diameter of the ridged tube 1310 and extending to a second greater outside diameter. Once the second outside diameter is reached, the diameter extends directly back to the first outside diameter, forming a series of ridges. The retainer 1320 includes angled sides 1321, 1322 and stops 1323, 1324 for engaging the ridged tube 1310. The combination of the angled sides 1321, 1322, the stops 1323, 1324, and the ridges 1311, 1312 allow the retainer to move up the ridged tube 1310 towards the base 517, but does not allow the retainer 1320 to slide back down the ridged tube 1310. Thus, the retainer 1320 cannot be removed without damaging either the ridged tube 1310 or the retainer 1320. In some implementations, the ridged tube 1310 and/or the retainer 1320 may be constructed using a flexible or semi-flexible material such as plastic or metal that allows for the retainer 1320 to flex as the retainer 1320 is cinched down as the retainer moves up the ridged tube 1310.

Figure 16:
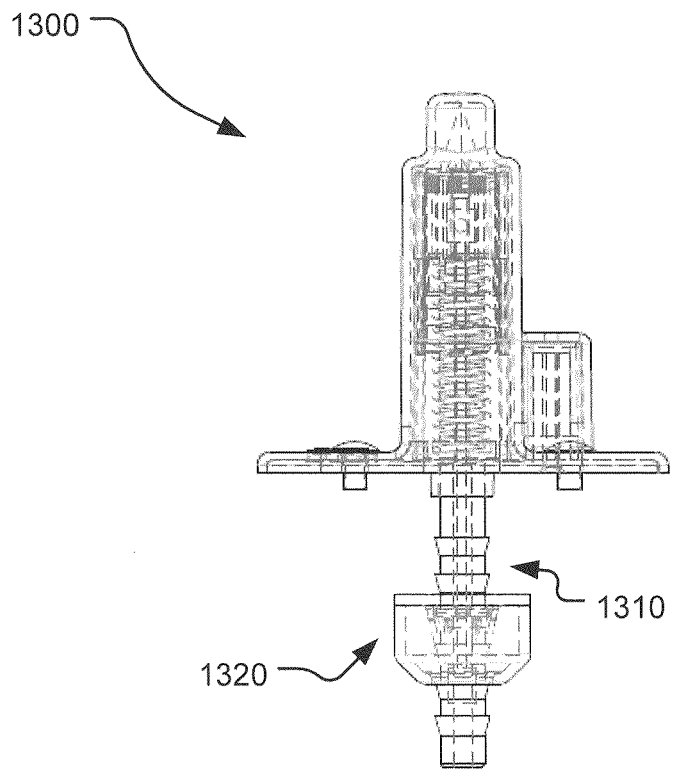
FIG. 16 illustrates a side view of the RFID locking apparatus of FIG. 13.
Figure 17:
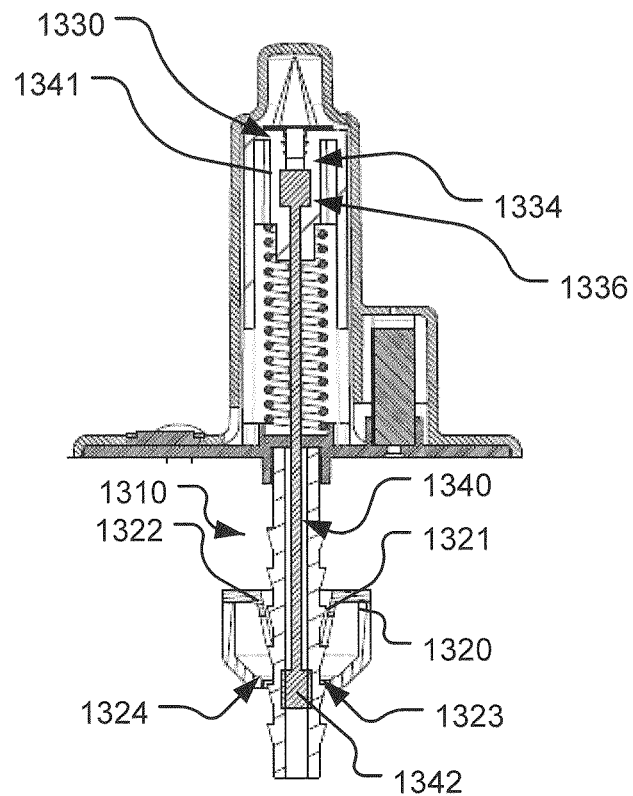
FIG. 17 illustrates a side perspective view of the internal components of the of the RFID locking apparatus of FIG. 13.

FIG. 16 illustrates a side view of the RFID locking apparatus of FIG. 13 with the cover installed. In this example, the RFID locking apparatus 1300 was armed by engaging the retainer 1320 on the ridged tube 1310 and subsequently triggered, resulting in the RFID tag 560 being disabled. FIG. 17 provides a side perspective view of the internal components of the of the RFID locking apparatus of FIG. 13. In this example, the disabling member 1330 is shown with the insert end 1341 of the cable 1340 attached and the disabling member 1330 puncturing the RFID tag 560. When the RFID locking apparatus 1300 was triggered the outer end 1342 of the cable 1340 is no longer held outside the ridged tube 1310, allowing for the compressed spring 540 to unload, causing the disabling member 1330 to disable the RFID tag 560.

Figure 18:
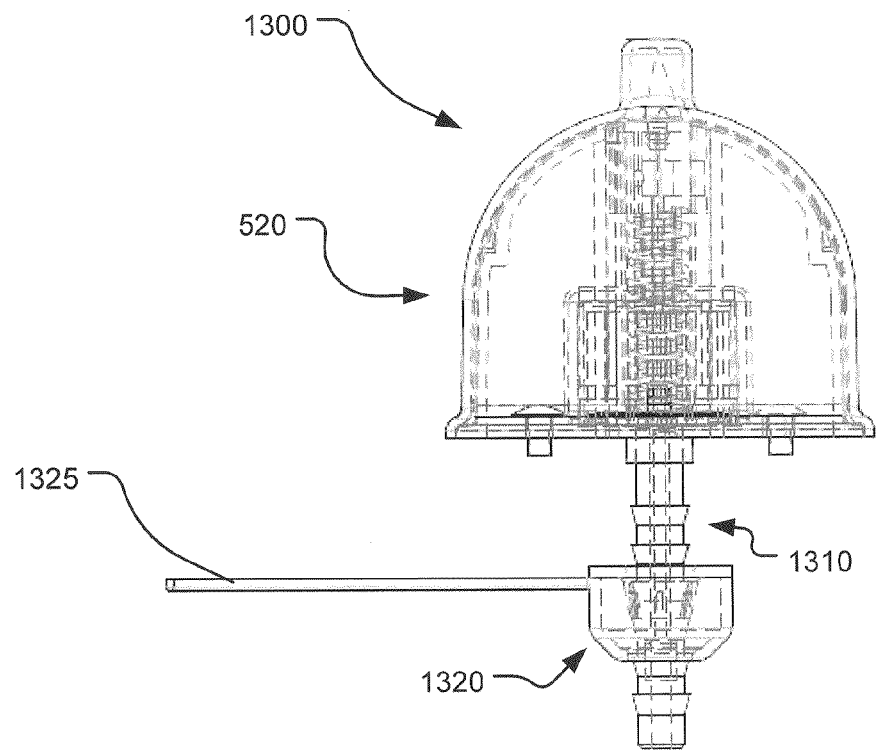
FIG. 18 illustrates a side perspective view of the example RFID locking apparatus of the RFID locking apparatus of FIG. 13.
Figure 19:
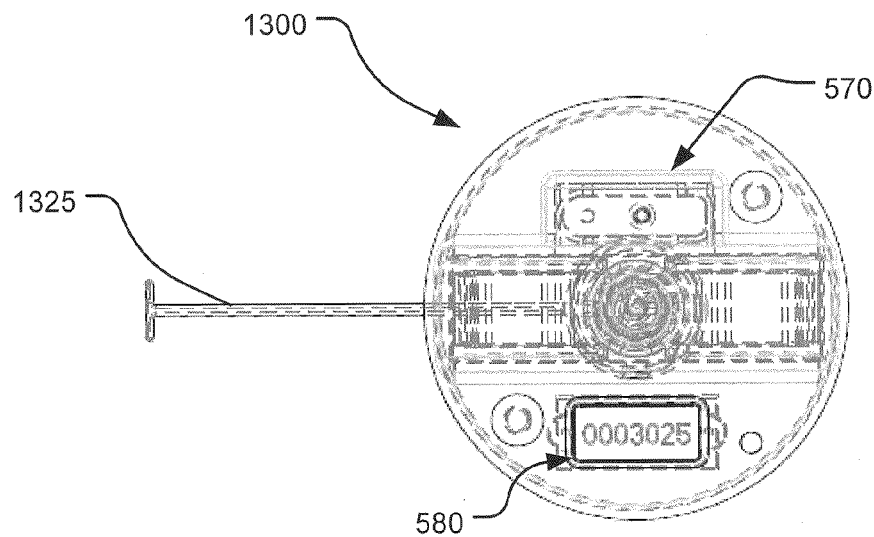
FIG. 19 illustrates a top perspective view of the of the RFID locking apparatus of FIG. 13.

FIG. 18 illustrates a side perspective view of the example RFID locking apparatus of the RFID locking apparatus of FIG. 13. In this example, the cover 520 has been installed and the RFID locking apparatus 1300 has been triggered. The retainer handle 1325 is also shown attached to the retainer 1320. FIG. 19 illustrates a top perspective view of the of the RFID locking apparatus of FIG. 13. The placement of the locking member 570 and label display 580 are also depicted from this perspective.

All directional references (e.g., proximal, distal, upper, lower, upward, downward, left, right, lateral, front, back, top, bottom, above, below, vertical, horizontal, clockwise, and counterclockwise) are only used for identification purposes to aid the reader's understanding of the presently disclosed technology, and do not create limitations, particularly as to the position, orientation, or use of the presently disclosed technology. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples, and data provide a complete description of the structure and use of example implementations of the presently disclosed technology. Since many implementations of the presently disclosed technology can be made without departing from the spirit and scope of the presently disclosed technology, the scope resides in the claims hereinafter appended. Furthermore, structural features of the different implementations may be combined in yet another implementation without departing from the recited claims. The scope of the presently disclosed technology is intended to embrace all such alternatives, modifications, and variations together with all equivalents thereof. The implementations described above and other implementations are within the scope of the following claims.

What is claimed is:

1. A method for arming an RFID locking apparatus, the method comprising:
    placing an RFID tag having a chip and an antenna configured to emit a signal within a housing;
    compressing a spring into a loaded state, positioning a disabling member to destroy one or more of the antenna and the chip, such that the signal cannot be emitted, upon release of the spring from the loaded state in response to at least a portion of a retainer being damaged; and
    securing the retainer to a cable exiting the housing and connected to the disabling member, the retainer and the cable holding the spring in the loaded state.

2. The method of claim 1, further comprising:
    engaging the cable to a shipping container.

3. The method of claim 1, wherein securing the retainer comprises sliding the retainer over a tube extending from the housing.

4. A method for arming an RFID locking apparatus, the method comprising:
    releasing a spring from a loaded state in response to a portion of a locking member being damaged, wherein the locking member includes a cable and a retainer, the cable holding the spring in the loaded state and the retainer holding the cable in place, wherein the retainer releases the cable in response to the portion of the locking member being damaged; and
    destroying one or more of an antenna and a chip of an RFID tag, such that the RFID tag cannot emit a signal, upon release of the spring from the loaded state.

5. The method of claim 4, wherein the locking member further comprises a tube extending from inside a housing to outside the housing, the tube in substantial alignment with the spring, wherein the cable passes through the tube and a middle of the spring to connect the disabling member and the retainer is configured to engage the tube and lock the cable.

6. The method of claim 5, wherein the tube comprises outside ridges and the retainer comprises angled sides with stops configured to allow the retainer to move along the tube towards the housing and to prevent the retainer from moving away from the housing.

7. The method of claim 6, wherein the cable comprises an insert end and the disabling member comprises a cavity shaped to accept the insert end and a channel configured to allow the passage of the insert end to the cavity and to allow the cable to exit the cavity.

* * * * *